US00RE49287E

(19) United States
(12) Reissued Patent
Tsai

(10) Patent Number: US RE49,287 E
(45) Date of Reissued Patent: Nov. 8, 2022

(54) SOCKET STRUCTURE WITH DUPLEX ELECTRICAL CONNECTION

(71) Applicant: KIWI CONNECTION, LLC, Waco, TX (US)

(72) Inventor: Chou Hsien Tsai, New Taipei (TW)

(73) Assignee: KIWI CONNECTION, LLC, Waco, TX (US)

(21) Appl. No.: 17/020,359

(22) Filed: Sep. 14, 2020

Related U.S. Patent Documents

Reissue of:
(64) Patent No.: 8,198,563
Issued: Jun. 12, 2012
Appl. No.: 12/759,408
Filed: Apr. 13, 2010

(30) Foreign Application Priority Data

Apr. 15, 2009 (TW) ..... 09811257
May 26, 2009 (TW) ..... 09811740
(Continued)

(51) Int. Cl.
*H01H 33/666* (2006.01)
*H01R 27/00* (2006.01)
*H01R 24/62* (2011.01)

(52) U.S. Cl.
CPC ..... *H01R 27/00* (2013.01); *H01R 24/62* (2013.01)

(58) Field of Classification Search
CPC ..... H01R 29/00; H01R 12/58; H01R 27/00; H01R 12/716; H01R 13/658;
(Continued)

(56) References Cited

U.S. PATENT DOCUMENTS 3,795,037 A 3/1974 Luttmer
3,808,577 A 4/1974 Mathauser
(Continued)

FOREIGN PATENT DOCUMENTS

CN 1370343 9/2002
CN 2682604 3/2005
(Continued)

OTHER PUBLICATIONS

"Cannon Trident Connectors," ITT Electronic Components, retrieved from https://www.ittcannon.com, 72 pages.
(Continued)

*Primary Examiner* — Christopher E. Lee
(74) *Attorney, Agent, or Firm* — Sheridan Ross, PC

(57) ABSTRACT

A socket structure includes a base; a slot, disposed on one end of the base and to be connected to one plug having one row of terminals; a tongue disposed on a front end of the base and within the slot so that chambers of the slot on two sides of the tongue may be normally and oppositely inserted and positioned into the slot; one row of first contacts separately arranged on one surface of the tongue, wherein each first contact is electrically connected to a first pin extending out of the base; and one row of second contacts separately arranged on the other surface of the tongue. Each second contact is electrically connected to a second pin extending out of the base. When the plug is inserted into the slot, the row of terminals of the plug are electrically connected to the row of first or second contacts.

35 Claims, 29 Drawing Sheets

(30) Foreign Application Priority Data

Jun. 5, 2009 (TW) ..... 09821002
Jan. 13, 2010 (TW) ..... 09910084

(58) Field of Classification Search
CPC .... H01R 13/642; H01R 13/64; H05K 5/0278; G06K 19/07732
USPC ..... 439/217, 218, 660, 541.5, 607.01, 67; 361/679.41
See application file for complete search history.

(56) References Cited

U.S. PATENT DOCUMENTS 3,810,258 A 5/1974 Mathauser
4,253,719 A 3/1981 Mcginley
4,258,969 A 3/1981 Stallard
4,421,371 A 12/1983 Clark et al.
4,537,459 A 8/1985 Brennan et al.
4,700,998 A 10/1987 Hvezda et al.
5,135,406 A 8/1992 Ishikawa
5,293,013 A 3/1994 Takahashi
5,295,843 A 3/1994 Davis et al.
5,431,578 A 7/1995 Wayne
5,445,528 A 8/1995 Frantz
5,496,186 A 3/1996 Dobbelaere et al.
5,518,416 A 5/1996 Kantner et al.
5,542,850 A 8/1996 Frantz
5,591,050 A 1/1997 Sueoka
5,595,503 A 1/1997 Pittman et al.
5,644,470 A 7/1997 Benedict et al.
5,772,448 A 6/1998 Ekrot et al.
5,773,901 A 6/1998 Kantner
5,800,220 A 9/1998 Feeny et al.
5,941,729 A 8/1999 Sri-jayantha
5,964,610 A 10/1999 Mccoy
6,033,247 A 3/2000 Gregory
6,074,225 A 6/2000 Wu et al.
6,095,861 A 8/2000 Lin et al.
6,127,941 A 10/2000 Van
6,132,223 A 10/2000 Seeley et al.
6,132,254 A 10/2000 Wu
6,190,190 B1 2/2001 Daly et al.
6,257,930 B1 7/2001 Yu
6,352,450 B1 3/2002 Bronk et al.
6,364,699 B1 4/2002 Hwang et al.
6,394,813 B1 5/2002 Stout et al.
6,417,718 B1 7/2002 Ota
6,461,192 B1 10/2002 Kwoka
6,530,793 B2 3/2003 Eichhorn et al.
6,544,075 B1 4/2003 Liao
6,565,366 B1 5/2003 Wu
6,599,152 B1 7/2003 Oliphant et al.
6,609,928 B1 * 8/2003 Le ..... H01R 13/658 439/541.5
6,744,634 B2 6/2004 Yen
6,792,487 B2 9/2004 Kao
6,796,844 B1 9/2004 Edwards
6,840,806 B2 1/2005 Kodama
6,887,108 B2 5/2005 Wu
6,901,457 B1 5/2005 Toombs et al.
6,948,983 B1 9/2005 Peng
6,962,510 B1 11/2005 Chen et al.
6,964,582 B2 11/2005 Zhuang et al.
6,981,887 B1 1/2006 Mese et al.
6,991,483 B1 1/2006 Milan et al.
7,001,192 B1 2/2006 Yeh
7,001,201 B1 2/2006 Peng
7,037,120 B1 5/2006 Yeh
7,059,914 B2 6/2006 Tsai
7,090,541 B1 8/2006 Ho
7,094,086 B2 8/2006 Teicher
7,094,089 B2 8/2006 Andre et al.
7,150,651 B1 12/2006 Yuan et al.
7,155,545 B1 12/2006 Wang
7,160,125 B1 1/2007 Teicher
7,165,998 B2 1/2007 Lee et al.
7,182,646 B1 * 2/2007 Chou ..... G06K 19/07732 439/660
7,198,522 B1 4/2007 Ho et al.
7,249,978 B1 7/2007 Ni
7,269,004 B1 * 9/2007 Ni ..... H05K 5/0278 361/679.41
7,275,940 B2 10/2007 Chen
7,300,320 B2 11/2007 Lee
7,314,383 B1 1/2008 Ho et al.
7,318,752 B2 * 1/2008 Fujimoto et al. ..... 439/660
7,329,128 B1 2/2008 Awad
7,341,458 B1 3/2008 Koh
7,347,747 B2 3/2008 Shimizu
7,352,601 B1 4/2008 Minneman et al.
7,359,208 B2 * 4/2008 Ni ..... 361/752
7,361,059 B2 * 4/2008 Harkabi et al. ..... 439/660
7,363,947 B2 4/2008 Teicher
7,387,539 B2 6/2008 Trenne
7,402,086 B2 7/2008 Pomerantz et al.
7,407,390 B1 8/2008 Ni
7,416,413 B2 8/2008 Liao
7,440,286 B2 10/2008 Hiew et al.
7,440,287 B1 * 10/2008 Ni et al. ..... 361/752
7,458,825 B2 12/2008 Atsmon et al.
7,462,071 B1 12/2008 Wu
7,465,181 B1 12/2008 Bridges et al.
7,467,977 B1 12/2008 Yi et al.
7,470,160 B1 12/2008 Mostoller et al.
7,500,861 B2 3/2009 Harkabi et al.
7,517,253 B1 * 4/2009 Chiang ..... H01R 12/58 439/218
7,547,218 B2 6/2009 Hiew et al.
7,553,172 B2 6/2009 Chiu et al.
7,572,153 B2 8/2009 Trenne
7,591,657 B2 9/2009 Teicher
7,601,034 B1 10/2009 Aekins et al.
7,604,512 B1 10/2009 Chen
7,628,655 B1 12/2009 Chen
7,635,280 B1 12/2009 Crumlin et al.
7,641,519 B1 1/2010 Chen
7,654,871 B2 2/2010 Yi et al.
7,670,156 B2 * 3/2010 Chen ..... 439/108
7,682,169 B2 3/2010 Park et al.
7,710,736 B2 5/2010 Middlekauff et al.
7,731,535 B1 6/2010 Wan et al.
7,740,499 B1 6/2010 Willey et al.
7,918,689 B2 4/2011 Sloey et al.
8,043,099 B1 10/2011 Ni et al.
8,073,985 B1 12/2011 Ni et al.
8,079,879 B2 12/2011 Chiang
8,167,638 B2 5/2012 Wojcik et al.
8,198,563 B2 6/2012 Tsai
8,241,047 B2 8/2012 Ni et al.
8,257,287 B2 9/2012 Hanlon et al.
8,328,434 B2 12/2012 Wang et al.
2003/0100203 A1 5/2003 Yen
2003/0171035 A1 9/2003 Yoo
2004/0023559 A1 2/2004 Wu
2004/0023560 A1 2/2004 Swoboda
2004/0103228 A1 5/2004 Kao
2004/0115990 A1 6/2004 Kodama
2005/0079738 A1 4/2005 Ahn
2005/0186810 A1 8/2005 Sardella et al.
2005/0186850 A1 8/2005 Tsai
2006/0024997 A1 * 2/2006 Teicher ..... H01R 29/00 439/217
2006/0056401 A1 3/2006 Bohm et al.
2006/0094301 A1 5/2006 Lee et al.
2006/0183371 A1 * 8/2006 Tsai ..... H01R 12/716 439/541.5
2007/0010115 A1 1/2007 Teicher
2007/0049115 A1 * 3/2007 Igarashi ..... H01R 27/00 439/607.01
2007/0058332 A1 3/2007 Canterbury et al.
2007/0072491 A1 * 3/2007 Huang ..... H01R 27/00 439/660
2007/0173129 A1 7/2007 Han
2007/0197053 A1 8/2007 Liao

(56) References Cited

U.S. PATENT DOCUMENTS

| | | | | |
|---|---|---|---|---|
| 2007/0202725 | A1 | 8/2007 | Teicher | |
| 2007/0202750 | A1 | 8/2007 | Nishiwaki et al. | |
| 2007/0243726 | A1* | 10/2007 | Trenne | H01R 13/642 439/67 |
| 2007/0281524 | A1 | 12/2007 | Pomerantz | |
| 2007/0300023 | A1 | 12/2007 | Cronin et al. | |
| 2008/0030963 | A1 | 2/2008 | Middlekauff et al. | |
| 2008/0064271 | A1 | 3/2008 | Hiew et al. | |
| 2008/0067248 | A1 | 3/2008 | Hiew et al. | |
| 2008/0119076 | A1 | 5/2008 | Teicher | |
| 2008/0130207 | A1 | 6/2008 | Schmidt | |
| 2008/0200072 | A1 | 8/2008 | Cheong | |
| 2008/0242149 | A1 | 10/2008 | Konno et al. | |
| 2008/0274633 | A1 | 11/2008 | Teicher | |
| 2008/0299833 | A1 | 12/2008 | Abe | |
| 2008/0305651 | A1 | 12/2008 | Mostoller et al. | |
| 2008/0311781 | A1 | 12/2008 | Wojcik et al. | |
| 2009/0011621 | A1 | 1/2009 | Trenne | |
| 2009/0042421 | A1 | 2/2009 | Zheng et al. | |
| 2009/0156055 | A1 | 6/2009 | Park et al. | |
| 2009/0258539 | A1* | 10/2009 | Zheng et al. | 439/607.41 |
| 2009/0318026 | A1 | 12/2009 | Yi et al. | |
| 2010/0075517 | A1 | 3/2010 | Ni et al. | |
| 2010/0081337 | A1 | 4/2010 | Dorogusker et al. | |
| 2010/0190382 | A1 | 7/2010 | Szini et al. | |
| 2010/0221936 | A1 | 9/2010 | Zhao et al. | |

FOREIGN PATENT DOCUMENTS

| | | | | |
|---|---|---|---|---|
| CN | 2682660 | | 3/2005 | |
| CN | 2733636 | | 10/2005 | |
| CN | 2791923 | | 6/2006 | |
| CN | 1969428 | | 5/2007 | |
| CN | 2909592 | | 6/2007 | |
| CN | 101015096 | | 8/2007 | |
| CN | 101103498 | | 1/2008 | |
| CN | 201038524 | | 3/2008 | |
| CN | 201113076 | | 9/2008 | |
| CN | 201113094 | | 9/2008 | |
| CN | 201142484 | | 10/2008 | |
| CN | 201369488 | | 11/2008 | |
| CN | 201181784 | | 1/2009 | |
| CN | 101419829 | | 4/2009 | |
| CN | 101877441 | | 4/2009 | |
| CN | 201303129 | | 9/2009 | |
| CN | 201312013 | | 9/2009 | |
| CN | 201315398 | | 9/2009 | |
| CN | 201319419 | | 9/2009 | |
| CN | 201319420 | | 9/2009 | |
| CN | 101557059 | | 10/2009 | |
| CN | 201332168 | | 10/2009 | |
| CN | 201340920 | | 11/2009 | |
| CN | 201345463 | | 11/2009 | |
| CN | 201345464 | | 11/2009 | |
| CN | 201352641 | | 11/2009 | |
| CN | 201360013 | | 12/2009 | |
| CN | 201365045 | | 12/2009 | |
| CN | 201369403 | | 12/2009 | |
| CN | 201374421 | | 12/2009 | |
| CN | 201378641 | | 1/2010 | |
| CN | 201402869 | | 2/2010 | |
| CN | 201402876 | | 2/2010 | |
| CN | 201413880 | | 2/2010 | |
| CN | 101677157 | | 3/2010 | |
| CN | 101677158 | | 3/2010 | |
| CN | 201440482 | | 4/2010 | |
| CN | 201450136 | | 5/2010 | |
| CN | 201450137 | | 5/2010 | |
| CN | 201478488 | | 5/2010 | |
| CN | 201478490 | | 5/2010 | |
| CN | 201478491 | | 5/2010 | |
| CN | 201478495 | | 5/2010 | |
| CN | 201478578 | | 5/2010 | |
| CN | 201490374 | | 5/2010 | |
| CN | 201490376 | | 5/2010 | |
| CN | 201490377 | | 5/2010 | |
| CN | 101728722 | | 6/2010 | |
| CN | 101728736 | | 6/2010 | |
| CN | 201498671 | | 6/2010 | |
| CN | 201508936 | | 6/2010 | |
| CN | 201515047 | | 6/2010 | |
| CN | 201515048 | | 6/2010 | |
| CN | 201515090 | | 6/2010 | |
| CN | 201533031 | | 7/2010 | |
| CN | 101800370 | | 8/2010 | |
| CN | 201540989 | | 8/2010 | |
| CN | 201540991 | | 8/2010 | |
| CN | 201549671 | | 8/2010 | |
| CN | 201562785 | | 8/2010 | |
| CN | 201570618 | | 9/2010 | |
| CN | 201594633 | | 9/2010 | |
| CN | 101859936 | | 10/2010 | |
| CN | 101882716 | | 11/2010 | |
| CN | 201656016 | | 11/2010 | |
| CN | 201663252 | | 12/2010 | |
| CN | 201663254 | | 12/2010 | |
| CN | 201682065 | | 12/2010 | |
| CN | 201708282 | | 1/2011 | |
| CN | 201717389 | | 1/2011 | |
| CN | 102013587 | | 4/2011 | |
| CN | 102025052 | | 4/2011 | |
| CN | 201812961 | | 4/2011 | |
| CN | 201838763 | | 5/2011 | |
| CN | 202084669 | | 12/2011 | |
| CN | 202121098 | | 1/2012 | |
| DE | 10034613 | | 1/2002 | |
| JP | 2003-217728 | | 7/2003 | |
| JP | 4035779 | | 1/2008 | |
| JP | 2008-508694 | | 3/2008 | |
| JP | 2008-210674 | | 9/2008 | |
| JP | 2008-300091 | | 12/2008 | |
| JP | 2009043717 | A * | 2/2009 | H01R 13/658 |
| KR | 10-2007-0039956 | | 4/2007 | |
| TW | M 253969 | U | 12/2004 | |
| WO | WO 02/043192 | | 5/2002 | |
| WO | WO 2005/013436 | | 2/2005 | |
| WO | WO 2006/065681 | | 6/2006 | |
| WO | WO 2008/065659 | | 6/2008 | |
| WO | WO 2008/121731 | | 10/2008 | |
| WO | WO 2009/069969 | | 6/2009 | |

OTHER PUBLICATIONS

"Department of Defense Interface Standard Aircraft/Store Electrical Interconnection System," Department of Defense, Report MIL-STD-1760E, Oct. 24, 2007, 219 pages.

"Why are so many plugs (USB, HDMI, Ethernet) asymmetrical?," Post by u/boomybx on Reddit, 2014, retrieved from reddit.com/r/askscience/comments/1lsjkf/why__are_so_many__plugs_usb_hdmi_ethernet/,12 pages.

Shankland "Intel's Light Peak: One PC cable to rule them all," CNET, 2009, retrieved from https://www.cnet.com/news/intels-light-peak-one-pc-cable-to-rule-them-all/, 4 pages.

Willington, "Flipper USB Enables Upside-Down USB Connections," HotHardware, Jul. 15, 2010, retrieved from https://hothardware.com/news/flipper-usb-enables-upsidedown-usb-connections.

Patent Registration Information and List of References in German Patent Publication No. 102010014793.1, accurate as of Jul. 21, 2020, 2 pages.

Patent Registration Information and List of References cited by Examiner in German Patent Publication No. 202010017854.1, accurate as of Jul. 21, 2020, 2 pages.

Official Action (with English translation) for Japanese Patent Application No. 2010-091610, dated Jul. 12, 2010, 2 pages.

Official Action (with English translation) for Japanese Patent Application No. 2012-002496, dated May 31, 2012, 4 pages.

Official Action (with English translation) for Korean Patent Application No. 2010-0034310, dated Jul. 27, 2011, 4 pages.

Official Action (with English translation) for Korean Patent Application No. 2010-0034310, dated Nov. 30, 2011, 4 pages.

(56) References Cited

OTHER PUBLICATIONS

Official Action (with English translation) for Korean Patent Application No. 2010-0034310, dated May 18, 2012, 2 pages.
Unpublished Taiwanese Patent Application No. 098112573 (no English translation available), filed Apr. 15, 2009, 25 pages.
Unpublished Taiwanese Patent Application No. 098117405 (no English translation available), filed May 26, 2009, 38 pages.
Unpublished Taiwanese Patent Application No. 099100847 (no English translation available), filed Jan. 13, 2010, 53 pages.
Bibliographic Data and Prosecution History (with English mechanical translation) for Taiwanese Patent Application No. 098210021, first published Jun. 5, 2009, 17 pages.
Bibliographic Data and Prosecution History (with English mechanical translation) for Taiwanese Patent Application No. 099108987, first published Oct. 16, 2010, 107 pages.
Bibliographic Data and Prosecution History (with English mechanical translation) for Taiwanese Patent Application No. 099224051, first published Nov. 11, 2011, 150 pages.
Bibliographic Data and Prosecution History (with English mechanical translation) for Taiwanese Patent Application No. 100203503, first published Nov. 11, 2011, 69 pages.
Bibliographic Data and Prosecution History (with English mechanical translation) for Taiwanese Patent Application No. 099225602, first published Apr. 1, 2012, 78 pages.
Bibliographic Data and Prosecution History (with English mechanical translation) for Taiwanese Patent Application No. 101208435, first published Dec. 11, 2012, 116 pages.
Official Action for U.S. Appl. No. 12/759,408, dated Oct. 17, 2011, 5 pages. Restriction Requirement.
Official Action for U.S. Appl. No. 12/759,408, dated Dec. 7, 2011, 11 pages.
Notice of Allowance for U.S. Appl. No. 12/759,408, dated Mar. 16, 2012, 6 pages.

* cited by examiner

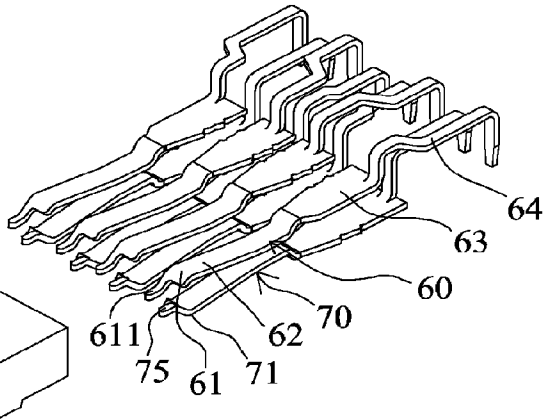
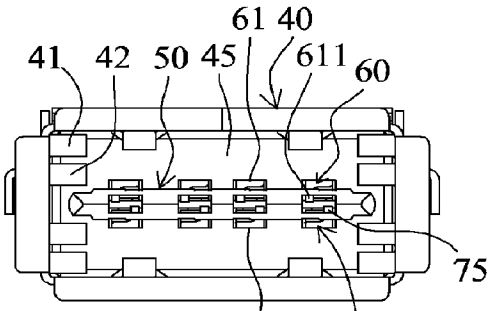
FIG. 37
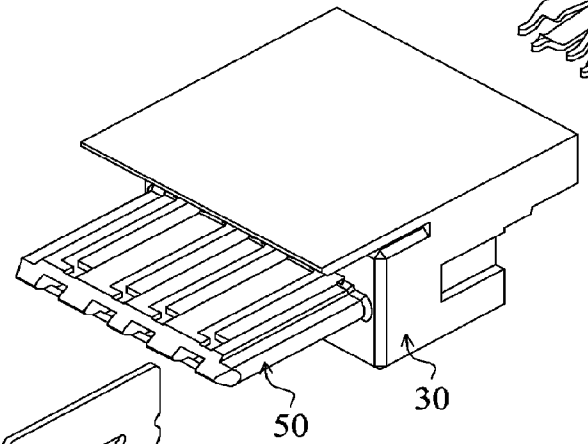
FIG. 35
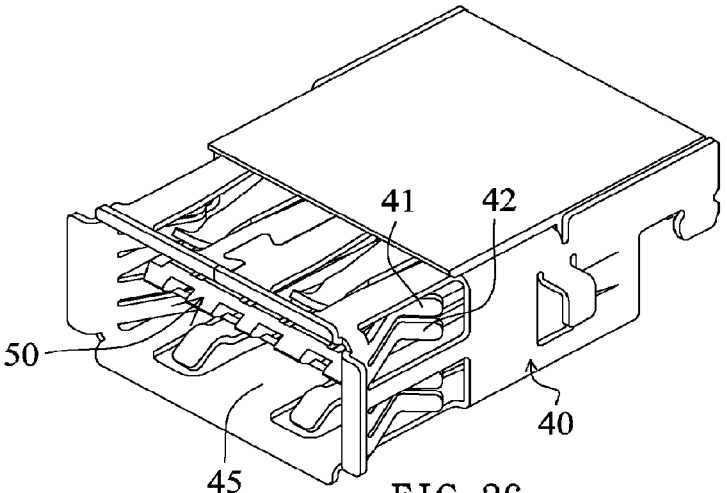
FIG. 36
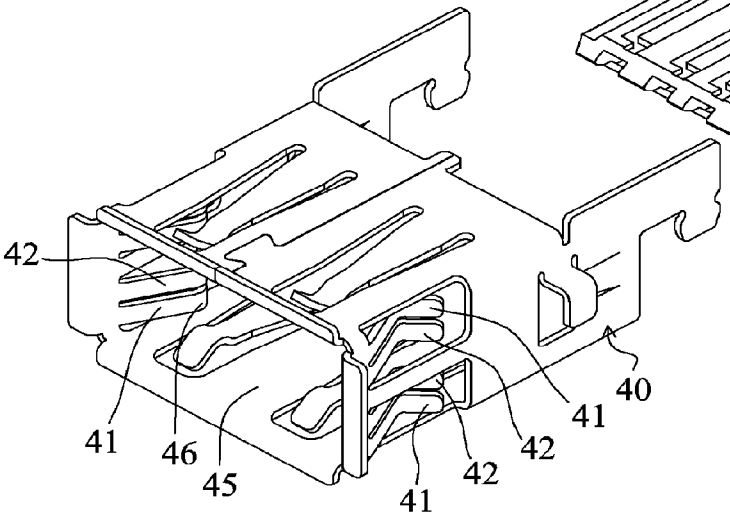

SOCKET STRUCTURE WITH DUPLEX ELECTRICAL CONNECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a Reissue of U.S. patent application Ser. No. 12/759,408, filed Apr. 13, 2010, now U.S. Pat. No. 8,198,563, which claims priority to Taiwan Application No. 99100847, filed Jan. 13, 2010, Taiwan Application No. 98210021, filed Jun. 5, 2009, Taiwan Application No. 98117405, filed May 26, 2009, and Taiwan Application No. 98112573, filed Apr. 15, 2009, each of which are incorporated herein by reference in their entirety.*

BACKGROUND OF THE INVENTION

1. Field of the Invention

The invention relates to an electrical connector, and more particularly to a socket structure with duplex electrical connection.

2. Related Art

The most popular signal transmission specification of the modern computer apparatus is the universal serial bus (USB). A connector socket and a transmission cable satisfying this specification may make peripheral apparatuses, such as a mouse, a keyboard and the like, which are externally connected to the computer, be immediately detected and used by the computer.

Only one surface of the USB plug has one row of connection terminals. So, one surface of a tongue of the current USB socket has one row of connection terminals. In use, the USB plug has to be correctly inserted so that the connection terminals of the USB plug and the USB socket may be electrically connected together.

In order to ensure the inserted USB plug to be electrically connected to the USB socket, the USB plug and socket have mistake-proof designs. That is, when the USB plug cannot be oppositely inserted, the user has to turn the USB plug and then insert the USB plug so that the electrical connection may be ensured after the insertion.

The user usually randomly inserts the USB plug into the USB socket. So, the possibility of incapable of inserting the USB plug reaches 50%. The user often has to insert the USB plug twice in an inconvenient manner.

Furthermore, the types of the plugs are gradually increased day after day. Also, the USB plugs having the same external shape may have different connection interfaces. If two plugs having the same external shape but different connection interfaces may be inserted into and electrically connected to the same socket, the usage of the socket may be diversified.

SUMMARY OF THE INVENTION

It is therefore an object of the invention to provide a socket structure with duplex electrical connection, wherein a plug may be normally and oppositely inserted into the socket structure to create electrical connection in a simple and easy way.

Another object of the invention is to provide a socket structure with duplex electrical connection, wherein the socket structure may be used as a dual-slot and may be simultaneously electrically connected to two plugs.

Still another object of the invention is to provide a socket structure with duplex electrical connection, wherein the socket structure may be electrically connected to two plugs, which have the same external shapes but different connection interfaces, in a diversified manner.

Yet still another object of the invention is to provide a socket structure with duplex electrical connection, wherein guide-in sheets of terminals on two surfaces of a tongue are vertically staggered so that the terminals on two surfaces of the tongue may be elastically moved alternately, the larger elastic moving chamber may be obtained and the contact of the terminal has the larger surface contact area.

Yet still another object of the invention is to provide a socket structure with duplex electrical connection, wherein at least one side of a metal housing of the socket structure projects inwardly to form at least one laterally elastically movable elastic sheet, and when a plug is inserted into a connection slot, the at least one elastic sheet may rest against the plug or the tongue to prevent the plug from being turned to break the tongue.

To achieve the above-identified objects, the invention provides a socket structure with duplex electrical connection. The socket structure includes a plastic base; a connection slot, disposed on one end of the base and to be connected to one plug having one row of terminals; a tongue disposed on a front end of the base and within the slot so that chambers of the slot on two sides of the tongue may be normally and oppositely inserted and positioned into the slot; one row of first contacts separately arranged on one surface of the tongue, wherein each first contact is electrically connected to a first pin extending out of the base; and one row of second contacts separately arranged on the other surface of the tongue, wherein each second contact is electrically connected to a second pin extending out of the base. When the plug is inserted into the slot, the row of terminals of the plug are electrically connected to the row of first or second contacts.

A metal housing covering the plastic base may further be provided. At least one side of the metal housing projects inwardly to form at least one laterally elastically movable elastic sheet. When the plug is inserted into the connection slot, the at least one elastic sheet may rest against the plug or the tongue to prevent the plug from turning.

The at least one row of first contacts and the first pins are formed on at least one row of first terminals. The at least one row of second contacts and the second pins are formed on at least one row of second terminals. The first contact and the second contact respectively project beyond one surface of the tongue. The row of first terminals and the row of second terminals pertain to the same connection interface and have oppositely arranged serial numbers. The front end of the first contact has a first guide-in sheet. The front end of the second contact has a second guide-in sheet. The first contact and the second contact are vertically aligned, and the first guide-in sheet and the second guide-in sheet are staggered in a left to right direction.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 35 is a pictorially exploded view showing a twelfth embodiment of the invention.

FIG. 36 is a pictorially assembled view showing the twelfth embodiment of the invention.

FIG. 37 is a front view showing the twelfth embodiment of the invention.

DETAILED DESCRIPTION OF THE INVENTION

The present invention will be apparent from the following detailed description, which proceeds with reference to the accompanying drawings, wherein the same references relate to the same elements.

Figure 1:
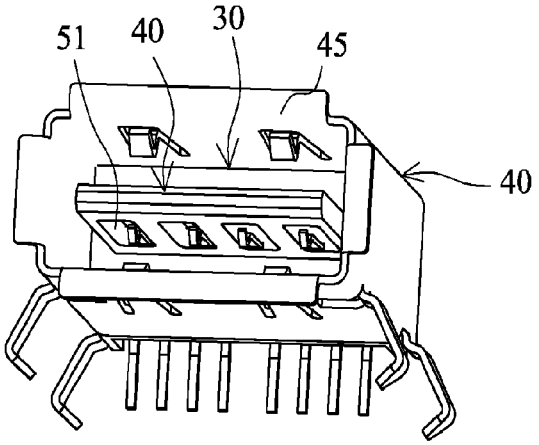
FIG. 1 is a pictorial view showing a first embodiment of the invention.
Figure 2:
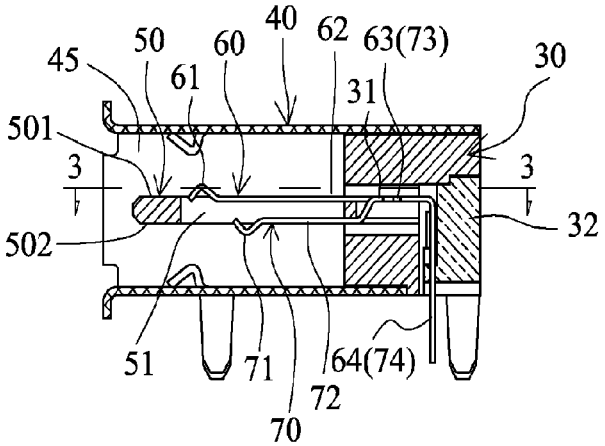
FIG. 2 is a cross-sectional side view showing the first embodiment of the invention.
Figure 3:
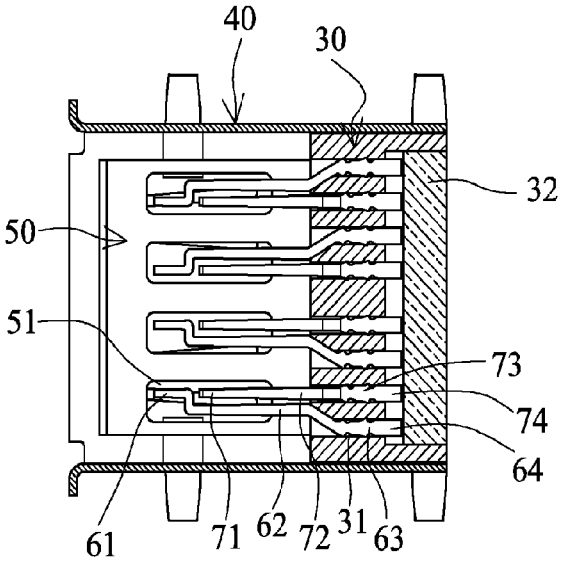
FIG. 3 is a cross-sectional top view showing the first embodiment of the invention.

Referring to FIGS. 1 to 3, a USB 2.0 socket of this embodiment includes a plastic base 30, a metal housing 40, a tongue 50, one row of first terminals 60 and one row of second terminals 70.

The plastic base 30 has one row of terminal slots 31, and a rear cover 32 covers a rear end of the plastic base 30 from bottom to top.

The metal housing 40 covers the plastic base 30. A front section of the metal housing is formed with a connection slot 45, which may be electrically connected to a USB 2.0 plug.

The tongue 50 and the plastic base 30 are integrally injection molded together. The tongue 50 has a first surface 501 and a second surface 502 disposed opposite the first surface 501, and is horizontally disposed on the front end of the plastic base 30 and at a middle of the connection slot 45, such that the connection slot 45 is formed with compatible and symmetrical profiles on top and bottom sides of the tongue 50 and compatible and symmetrical profiles on left and right sides of the tongue 50. Thus, the USB 2.0 plug is normally and oppositely inserted and positioned into the connection slot 45 to create the bidirectional insertion and connection, and the tongue 50 has four through slots 51 separately arranged.

One row of four first terminals 60 are separately arranged and fixed to the plastic base 30. The first terminal is integrally formed with a first contact 61, a first extension 62, a first fixing portion 63 and a first pin 64. The first fixing portion 63 is fixed to the terminal slot 31 of the plastic base 30. The first contact 61, arranged on the first surface 501 of the tongue 50, projects beyond the top of the tongue 50 and is elastically moved in correspondence with the through slot 51. The first pin 64 extends out of the plastic base 30.

The one row of second terminals 70 and the one row of first terminals 60 pertain to the same connection interface and the terminals have oppositely arranged serial numbers. Also, there are four second terminals 70 separately arranged and fixed to the plastic base 30. The second terminal is integrally formed with a second contact 71, a second extension 72, a second fixing portion 73 and a second pin 74. The second fixing portion 73 is fixed to the terminal slot 31 of the plastic base 30. The second contact 71, arranged on the second surface 502 of the tongue 50, projects beyond the bottom of the tongue 50 and is elastically moved in correspondence with the through slot 51. The second pin 74 extends out of the plastic base 30. The first contact 61 of the first terminal 60 and the second contact 71 of the second terminal 70 corresponding to the same through slot 51 are aligned with each other in a front to rear direction.

The one row of second terminals 70 and the one row of first terminals 60 have oppositely arranged serial numbers. As shown in FIG. 4A, the second terminals 70 on the bottom of the tongue have the serial numbers of 1, 2, 3, 4 from left to right, while the first terminals 60 on the top of the tongue have the serial numbers of 4, 3, 2, 1 from left to right. Thus, the same signal sorting may be obtained when the USB 2.0 plug is normally and oppositely electrically connected thereto.

The one row of first terminals 60 and the one row of second terminals 70 are formed by pressing the same metal sheet. So, the first fixing portion 63 and the second fixing portion 73 are located on the same level so that the two rows may be assembled with and fixed to the terminal slots 31 of the plastic base 30 at a time. In addition, the first pin 64 and the second pin 74 are aligned in one row.

Figure 4:
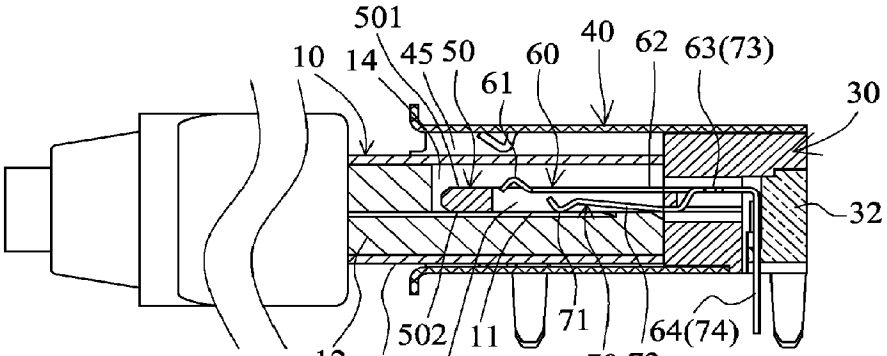
FIG. 4 shows the usage state of the first embodiment of the invention.
Figure 5:
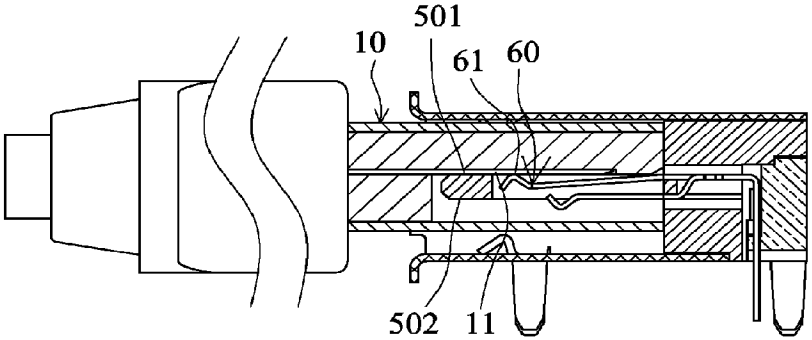
FIG. 5 shows the usage state of the first embodiment of the invention.
Figure 4A:
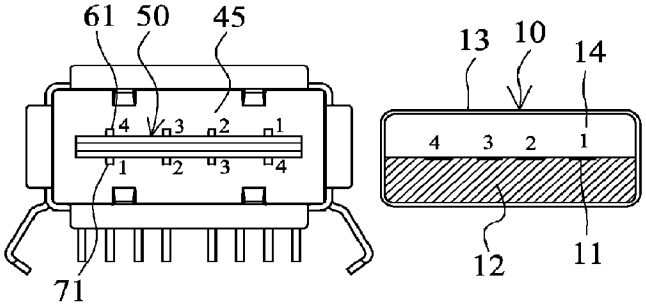
FIG. 4A is a front view showing the first embodiment of the invention and the normal state of the USB 2.0 plug.
Figure 5A:
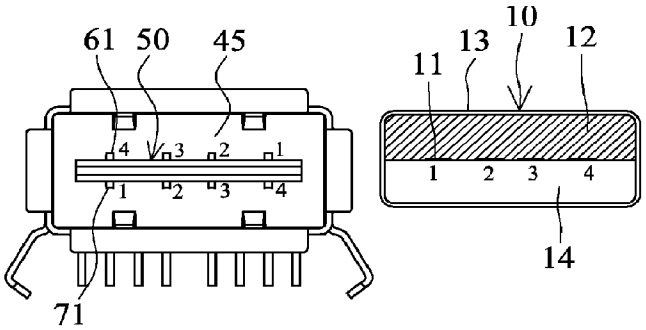
FIG. 5A is a front view showing the first embodiment of the invention and the opposite state of the USB 2.0 plug.

According to the above-mentioned structure, FIGS. 4 and 4A show the usage states of the USB 2.0 plug of a signal line. FIG. 4A is a front view showing the socket of the invention and the plug 10 in a normal state. The USB 2.0 plug 10 has a plastic base 12 and a metal housing 13 covering the plastic base 12. A chamber 14 is formed between the metal housing 13 and the plastic base 12. One surface of the plastic base 12 is formed with one row of connection terminals 11. In a front view, the one row of connection terminals 11 have the serial numbers of 4, 3, 2, 1 from left to right. When the connection terminals 11 of the USB 2.0 plug 10 face the second surface 502 of the tongue 50 and are normally inserted into the connection slot 45, its chamber 14 is fitted with the tongue 50, and its one row of connection terminals 11 are turned into the serial numbers of 1, 2, 3, 4 from left to right, and are electrically connected to the second contact 71 of the one row of second terminals 70 on the bottom of the tongue 50 (the serial numbers are 1, 2, 3, 4 from left to right). As shown in FIGS. 5 and 5A, when the connection terminals 11 of the USB 2.0 plug 10 face the first surface 501 of the tongue 50 and are oppositely inserted into the connection slot 45, its chamber 14 is also fitted with the tongue 50, and its one row of connection terminals 11 are turned into the serial numbers of 4, 3, 2, 1 from left to right and are electrically connected to the first contacts 61 of the one row of first terminals 60 on the top of the tongue 50 (the serial numbers are 4, 3, 2, 1 from left to right). Because the tongue 50 is horizontally disposed at the middle of the connection slot 45, the profile of the connection slot 45 above the tongue 50 is symmetrical with the profile thereof below the tongue, and the profiles of the connection slot 45 on the left and right sides of the tongue are symmetrical with each other. Thus, the USB 2.0 plug 10 may be normally and oppositely inserted and positioned into the connection slot 45.

According to the above-mentioned description, it is obtained that the invention may be electrically connected to the USB 2.0 plug, which is normally and oppositely inserted, so that the convenience in use may be obtained.

Figure 6:
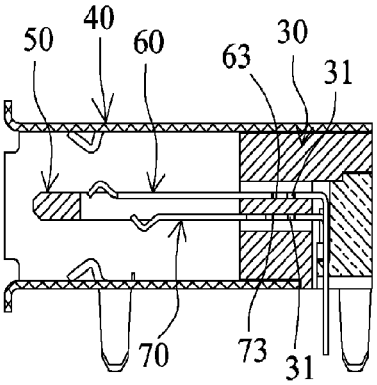
FIG. 6 is a cross-sectional side view showing a second embodiment of the invention.

As shown in FIG. 6, the second embodiment of the invention is almost the same as the first embodiment except that the plastic base 30 of this embodiment has two rows of terminal slots 31, and the one row of first terminals 60 and the one row of second terminals 70 are formed by respectively pressing two metal sheets. So, the first fixing portion 63 is engaged with the upper terminal slot 31 of the plastic base 30, and the second fixing portion 73 is engaged with the lower terminal slot 31 of the plastic base 30.

Figure 7:
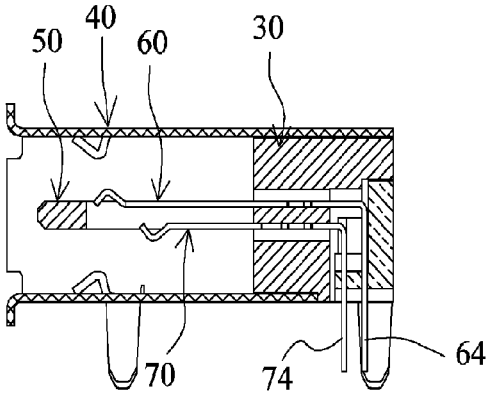
FIG. 7 is a cross-sectional side view showing a third embodiment of the invention.

As shown in FIG. 7, the third embodiment of the invention is almost the same as the second embodiment except that the first pins 64 of the one row of first terminals 60 and the first pins 74 of the one row of second terminals 70 of this embodiment are staggered and respectively arranged in two rows.

Figure 8:
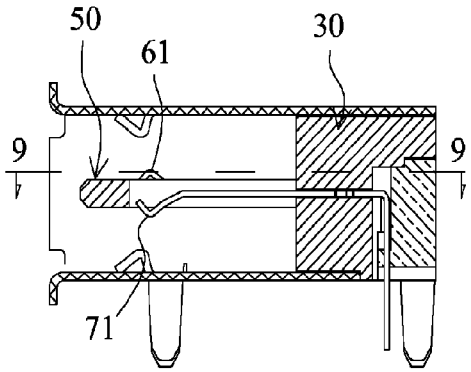
FIG. 8 is a cross-sectional side view showing a fourth embodiment of the invention.
Figure 9:
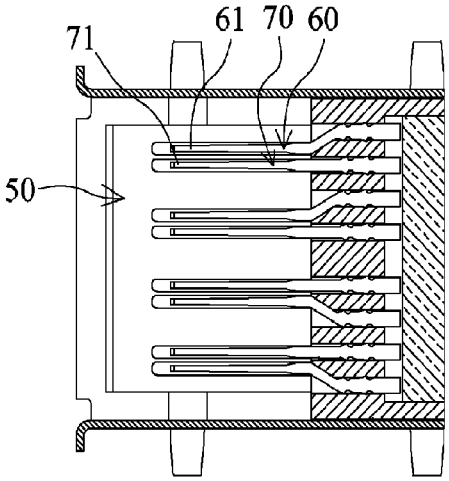
FIG. 9 is a cross-sectional top view showing the fourth embodiment of the invention.

As shown in FIGS. 8 and 9, the fourth embodiment of the invention is almost the same as the first embodiment except that the first contact 61 of the first terminal 60 and the second contact 71 of the second terminal 70 of this embodiment are parallel to each other in a left to right direction.

Figure 10:
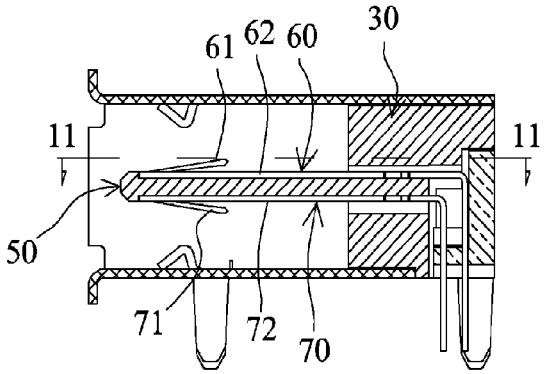
FIG. 10 is a cross-sectional side view showing a fifth embodiment of the invention.
Figure 11:
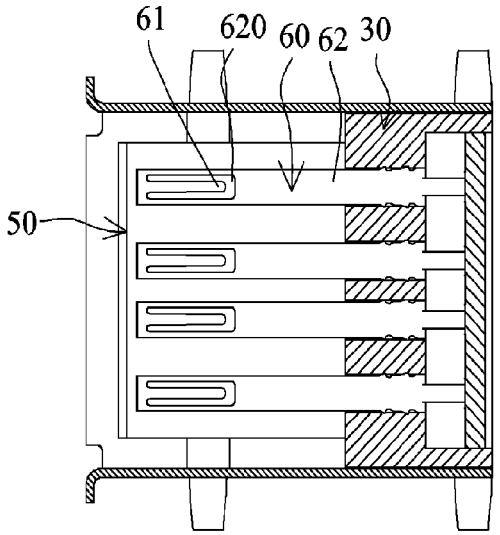
FIG. 11 is a cross-sectional top view showing the fifth embodiment of the invention.
Figure 12:
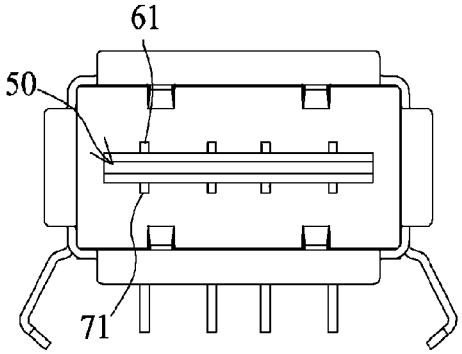
FIG. 12 is a front view showing the fifth embodiment of the invention.

As shown in FIGS. 10 to 12, the fifth embodiment of the invention is almost the same as the first embodiment except that the tongue 50 of this embodiment needs not to be formed with the through slot. The first contact 61 of the first terminal 60 is formed by prodding the plate surface of the first extension 62 and projects beyond the plate surface. The one end of the first contact 61 is connected to the first extension 62 and gradually protrudes to the other end from front to rear and is opened. The plate surface of the first extension 62 has an opening 620. When the first contact 61 is pressed and flattened, the first contact 61 may lie on the opening 620. The one row of second terminals 70 and the one row of first terminals 60 have the same structure, pertain to the same connection interface and have oppositely arranged serial numbers. The second contact 71 of the second terminal 70 is formed by prodding the plate surface of the second extension 72 and projects beyond the plate surface. The one end of the second contact 71 is connected to the second extension 72, and gradually protrudes to the other end from front to rear and is opened. The first contact 61 and the second contact 71 are vertically aligned with each other.

Figure 14:
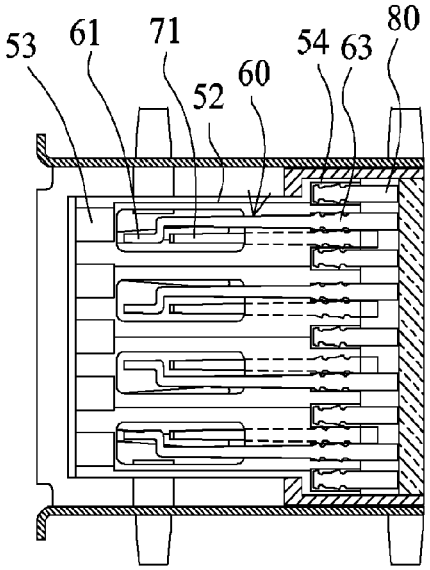
FIG. 14 is a cross-sectional top view showing the sixth embodiment of the invention.
Figure 13:
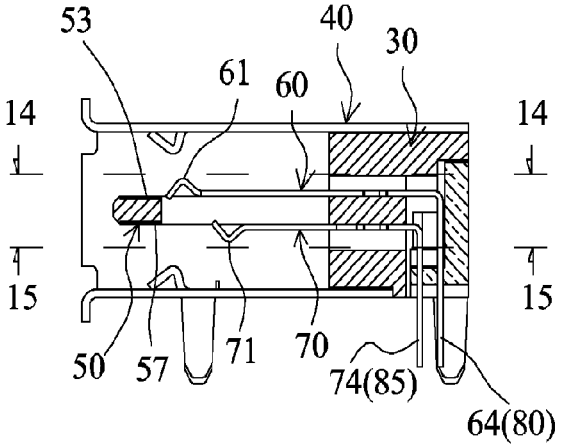
FIG. 13 is a cross-sectional side view showing a sixth embodiment of the invention.
Figure 15:
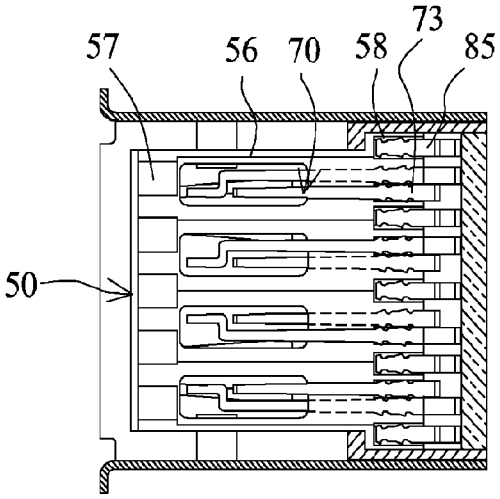
FIG. 15 is a cross-sectional bottom view showing the sixth embodiment of the invention.

As shown in FIGS. 13 to 15, the sixth embodiment of the invention is a USB 3.0 socket, which is substantially the same as the third embodiment except that this embodiment further has one row of first contacts 53 disposed in front of the first contacts 61, and one row of second contacts 57 disposed in front of the second contact 71 in addition to one row of first contacts 61 and one row of second contacts 71. That is, the tongue 50 is a circuit board assembled and positioned in the plastic base 30. Five first traces 52 are disposed on the top surface of the tongue 50, and have first contacts 53 separately arranged on the front section of the tongue and first connection terminals 54 disposed on the rear section of the tongue. The row of first connection terminals 54 are electrically connected to an additional row of first pins 80. Five second traces 56 are disposed on a bottom surface of the tongue 50, and have second contacts 57 separately arranged on the front section of the tongue and second connection terminals 58 disposed on the rear section of the tongue. The row of second connection terminals 58 are electrically connected to an additional row of second pins 85.

The one row of first contacts 53 and the one row of second contacts 57 pertain to the same connection interface and have oppositely arranged serial numbers.

The one row of first pins 80 are bonded to the one row of first connection terminals 54. The one row of second pins 85 are bonded to the one row of second connection terminals 58. In addition, the first fixing portion 63 of the one row of first terminals 60 is bonded and fixed to the top surface of the tongue 50. First fixing portions 73 of the one row of second terminals 70 are bonded and fixed to the bottom surface of the tongue 50. The one row of first pins 80 and the first pins 64 of the one row of first terminals 60 are arranged in a row. The one row of second pins 85 and the second pins 74 of the one row of second terminals 70 are arranged in a row.

Figure 16:
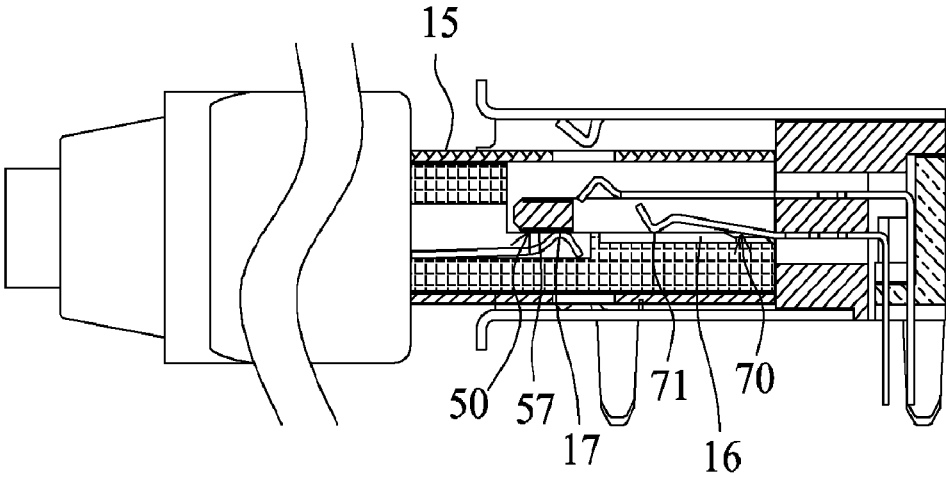
FIGS. 16 and 17 show the usage states of the sixth embodiment of the invention.
Figure 17:
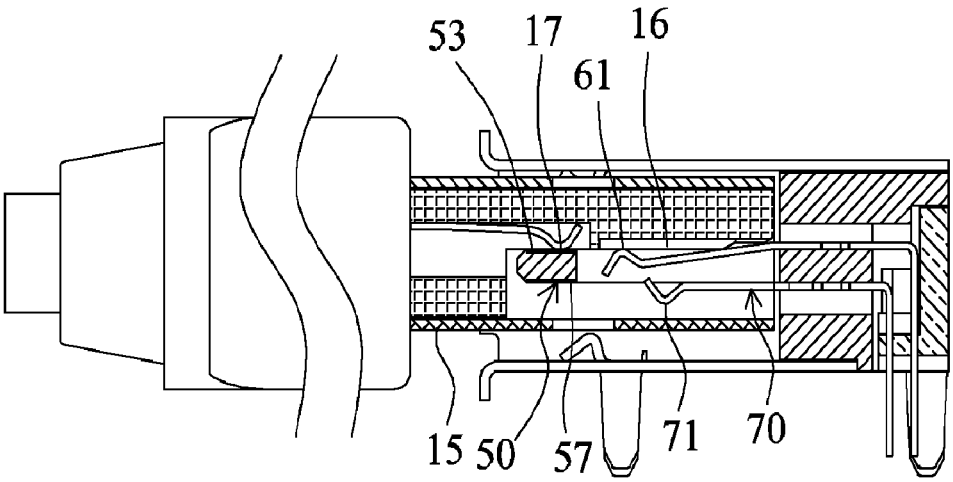

According to the above-mentioned structure, as shown in FIG. 16, when the USB 3.0 plug 15 is normally inserted, its one row of connection terminals 16 are electrically connected to the second contacts 71 of the second terminals 70. The other row of connection terminals 17 are electrically connected to the second contacts 57 of the second traces. As shown in FIG. 17, when the USB 3.0 plug 15 is oppositely inserted, its one row of connection terminals 16 are electrically connected to the first contacts 61 of the first terminals 60, and the other one row of connection terminals 17 are electrically connected to the first contacts 53 of the first traces.

Figure 18:
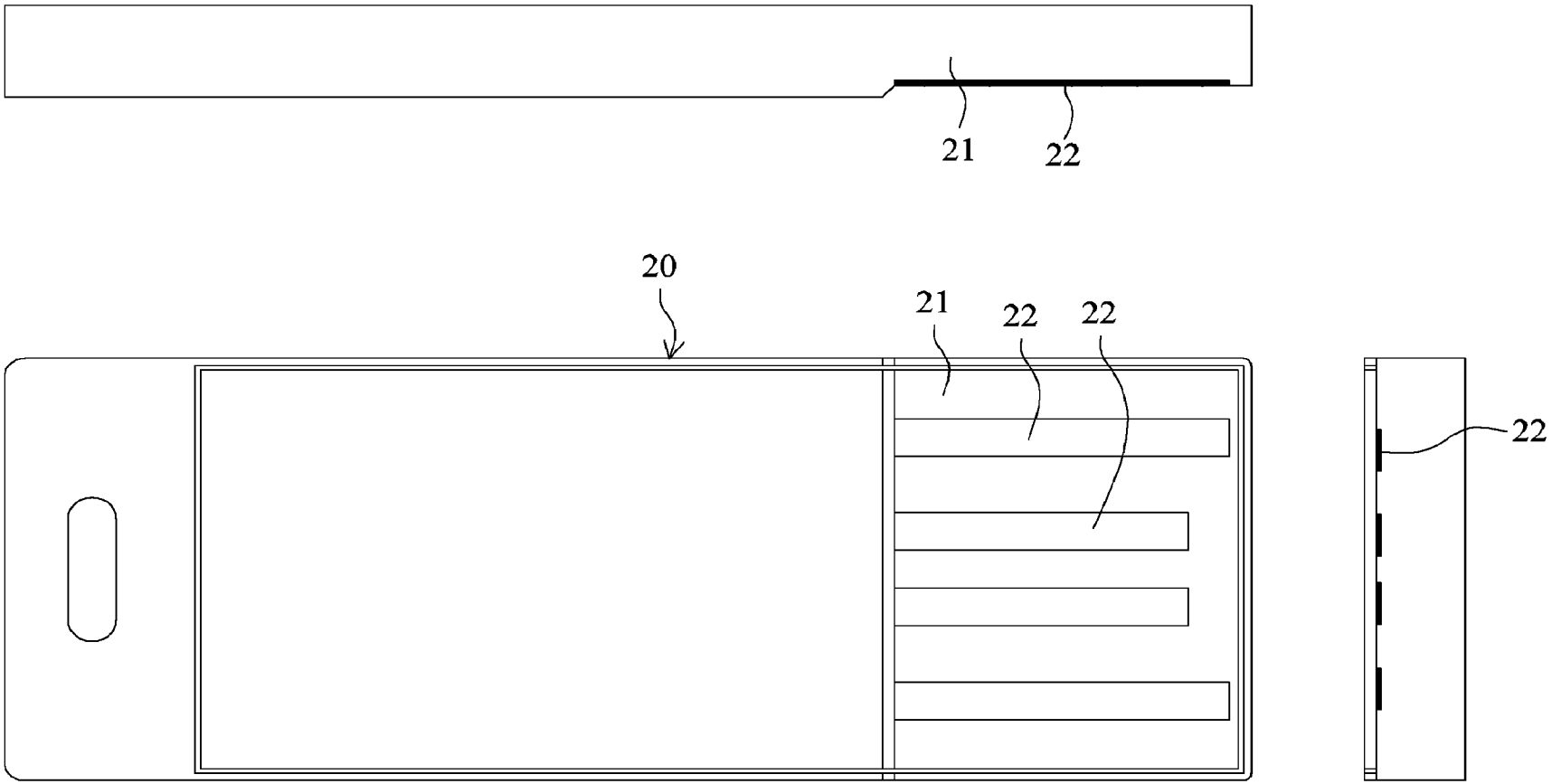
FIG. 18 is a pictorial view showing a light and handy mobile disk.

FIG. 18 is a pictorial view showing a light and handy mobile disk 20. One end of the disk 20 has a plug 21, which is a USB 2.0 plug without a metal housing. One surface of the plug 21 has four connection terminals 22, which are separately arranged and cannot be elastically moved.

Figure 19:
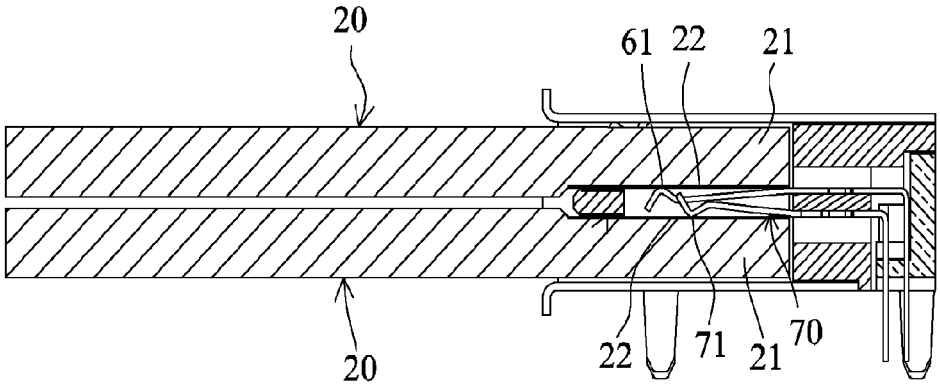
FIG. 19 shows the usage state of the sixth embodiment of the invention.

FIG. 19 shows the usage state of the light and handy mobile disk 20. When the plug 21 is connected to the top of the tongue 50, the one row of connection terminals 22 are electrically connected to the first contacts 61 of the one row of first terminals 60 on the top of the tongue. When the plug 21 is connected to the bottom of the tongue 50, the one row of connection terminals 22 are electrically connected to the second contacts 71 of the one row of second terminals 70 on the bottom of the tongue. According to the above-mentioned description, it is obtained that the socket structure of the invention, when being connected to the light and handy mobile disk, may serve as a dual-slot so that two light and handy mobile disks may be simultaneously connected thereto.

Figure 20:
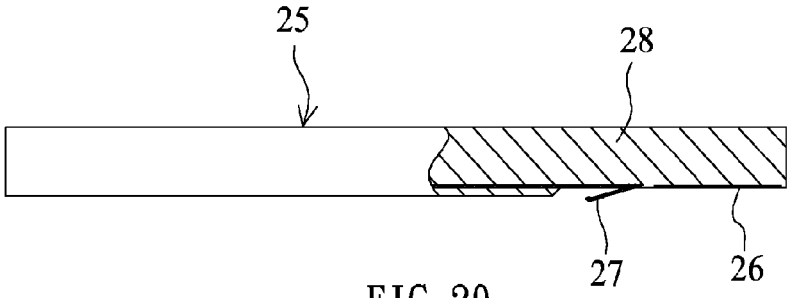
FIG. 20 is a side view showing another light and handy mobile disk.

FIG. 20 is a side view showing another light and handy mobile disk 25. One end of the disk 25 has a plug 28, which is a USB 3.0 plug without a metal housing. The plug 28 is substantially the same as the plug 20. One surface of the plug 28 is formed with one row of four connection terminals 26, which are separately arranged and cannot be elastically moved, and further formed with one row of five connection terminals 27, which are separately arranged and may be moved elastically.

Figure 21:
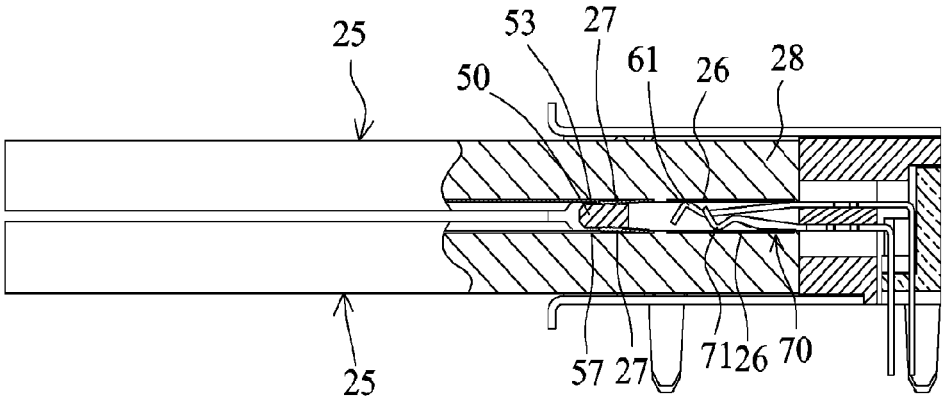
FIG. 21 shows the usage state of the sixth embodiment of the invention.

FIG. 21 shows the usage state of the light and handy mobile disk 25. When the plug 28 is electrically connected to the top surface of the tongue 50, the one row of connection terminals 26 are electrically connected to the first contacts 61 of the one row of first terminals 60 on the top of the tongue. The one row of connection terminals 27 are electrically connected to the first contacts 53 of one row of first traces on the top surface of the tongue. When the plug 28 is electrically connected to the bottom of the tongue 50, the one row of connection terminals 26 are electrically connected to the first contacts 71 of the one row of second terminals 70 on the bottom of the tongue. The one row of connection terminals 27 are electrically connected to the second contacts 57 of one row of second traces on the bottom surface of the tongue, so that two light and handy mobile disks 25 may be simultaneously connected to the top and bottom sides of the tongue 50.

Figure 22:
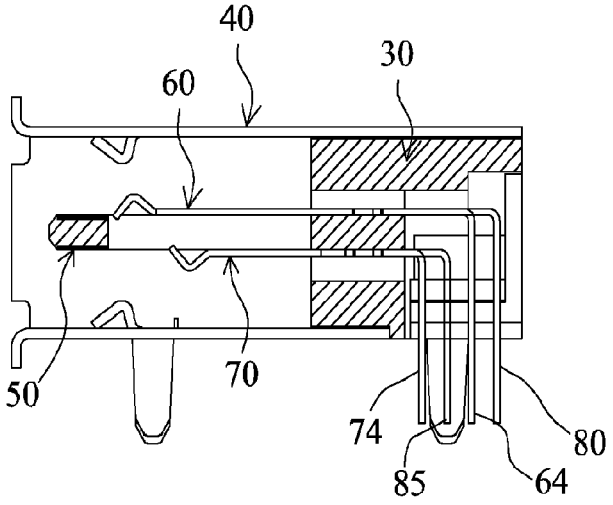
FIG. 22 is a cross-sectional side view showing a seventh embodiment of the invention.

As shown in FIG. 22, the seventh embodiment of the invention is almost the same as the sixth embodiment except that the one row of first pins 80 are not aligned with the first pins 64 of the one row of first terminals 60 in this embodiment, and the one row of second pins 85 are not aligned with the second pins 74 of the one row of second terminals 70.

Figure 23:
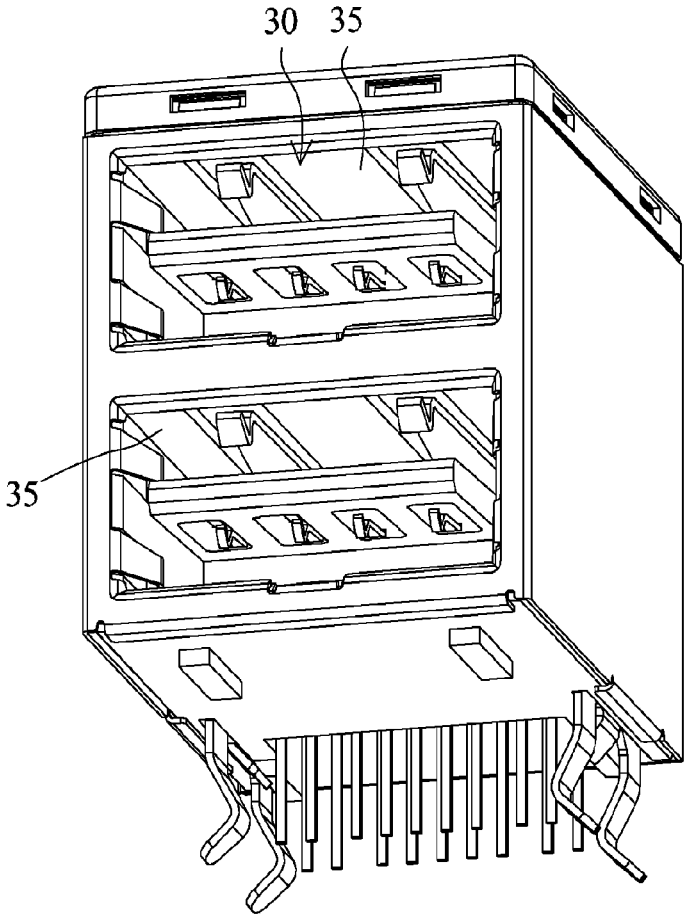
FIG. 23 is a pictorial view showing an eighth embodiment of the invention.
Figure 26:
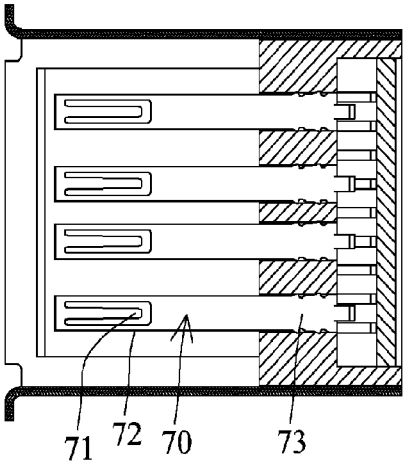
FIG. 26 is a cross-sectional bottom view showing the ninth embodiment of the invention.
Figure 25:
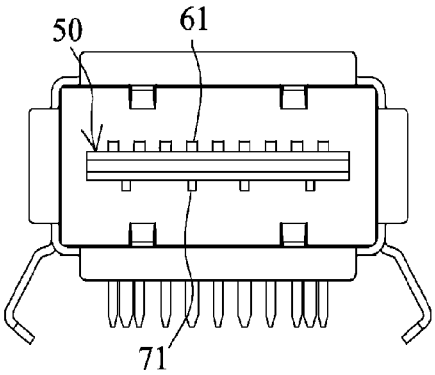
FIG. 25 is a front view showing the ninth embodiment of the invention.
Figure 24:
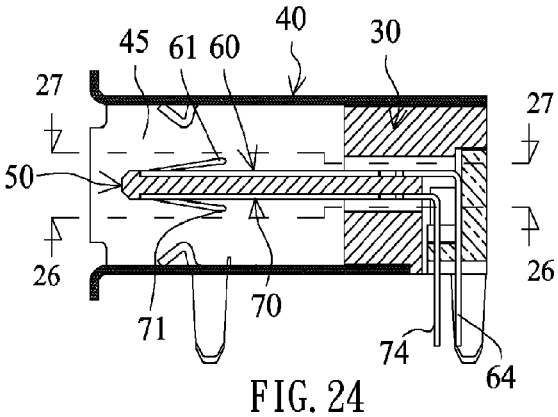
FIG. 24 is a cross-sectional side view showing a ninth embodiment of the invention.
Figure 27:
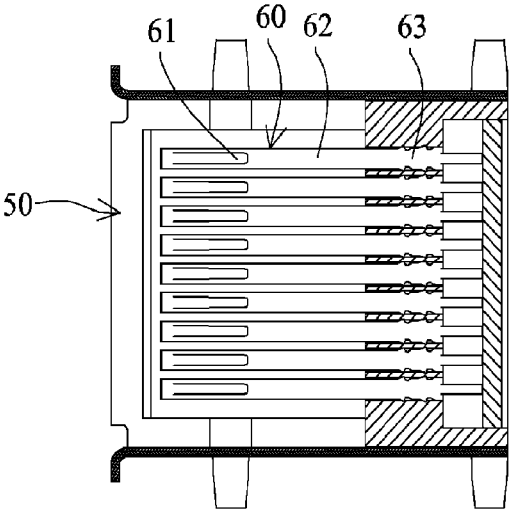
FIG. 27 is a cross-sectional top view showing the ninth embodiment of the invention.

As shown in FIG. 23, the eighth embodiment of the invention is almost the same as the first embodiment except that this embodiment pertains to a multilayer USB 2.0 socket, and the plastic base 30 has two connection slots 35 stacked together.

As shown in FIGS. 24 to 27, the ninth embodiment of the invention is almost the same as the fifth embodiment, and its tongue 50 is also disposed at the middle of the connection slot 45, so that the chamber above the tongue 50 of the connection slot 45 is the same as the chamber below the tongue 50, and the chambers on the left and right sides of the tongue are the same. The difference between the ninth and fifth embodiments is that the one row of first terminals 60 on the top surface of the tongue 50 and the one row of second terminals 70 on the bottom surface of the tongue 50 pertain to different connection interfaces in this embodiment. The one row of four second terminals 70 are separately arranged on the bottom surface of the tongue 50. The second terminals 70 of the ninth and fifth embodiments have the same structure. The second terminal 70 is also integrally formed with a second contact 71, a second extension 72, a second fixing portion 73 and a second pin 74. The one row of nine first terminals 60 are separately arranged on the top surface of the tongue 50. The structure of the first terminal 60 is almost the same as that of the second terminal 70, and is also integrally formed with a first contact 61, a first extension 62, a first fixing portion 63 and a first pin 64.

Figure 28:
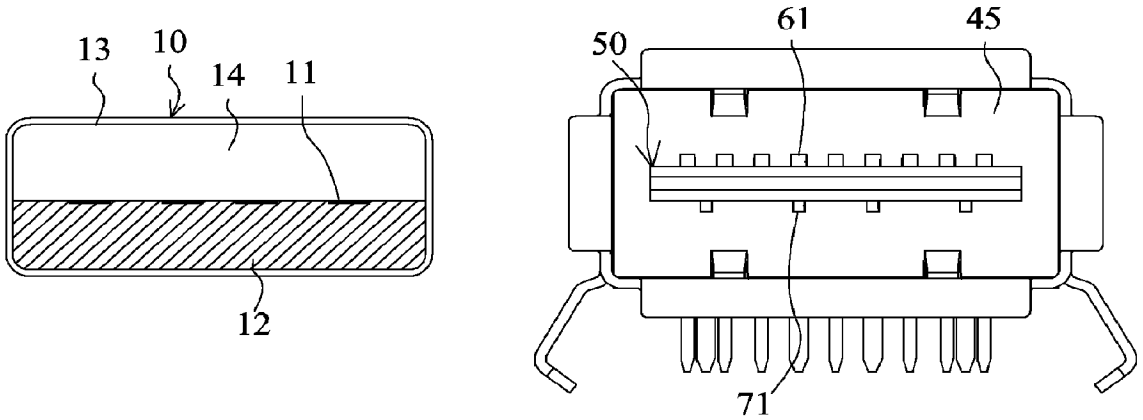
FIGS. 28 and 29 show the usage states of the ninth embodiment of the invention.
Figure 29:
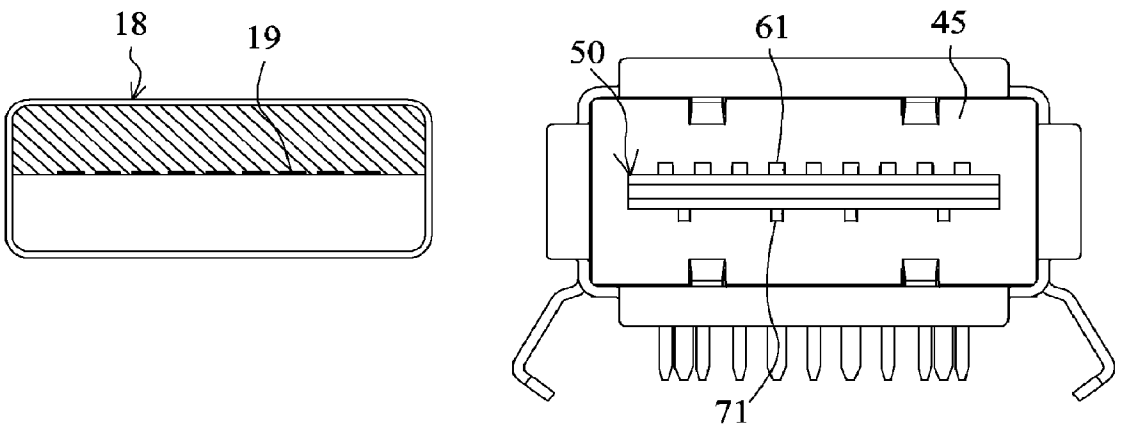

FIG. 28 shows the usage state of the USB 2.0 plug 10 of the signal line. When the connection terminal 11 of the USB 2.0 plug 10 is inserted upwardly into the connection slot 45, its chamber 14 is fitted with the tongue 50, and its one row of connection terminals 11 are electrically connected to the second contacts 71 of the second terminals 70 on the bottom of the tongue 50. FIG. 29 shows the usage state of the plug 18 having the shape the same as that of the USB 2.0 plug but a connection interface different from that of the USB 2.0 plug. The plug 18 has one row of nine connection terminals 19. When the connection terminal 19 of the plug 18 is inserted downwardly into the connection slot 45, its one row of connection terminals 19 are electrically connected to the first contacts 61 of the first terminals 60 on the top of the tongue 50.

According to the above-mentioned description, it is obtained that the socket structure of this embodiment may be electrically connected to two plugs having metal housings and the same shape but different connection interfaces so that the usage thereof may be diversified.

Of course, the socket structure of this embodiment may also be connected to two light and handy mobile disks or storage cards having two different connection interfaces but having no metal housing.

Figure 30:
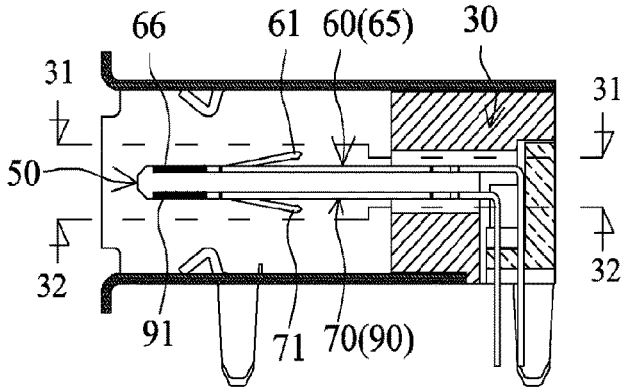
FIG. 30 is a cross-sectional side view showing a tenth embodiment of the invention.
Figure 31:
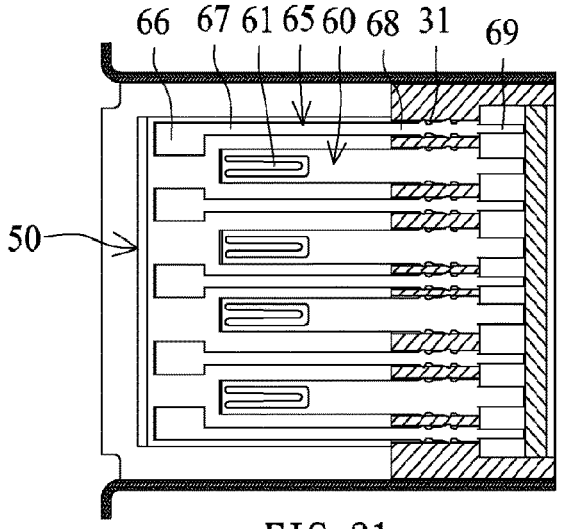
FIG. 31 is a cross-sectional top view showing the tenth embodiment of the invention.
Figure 32:
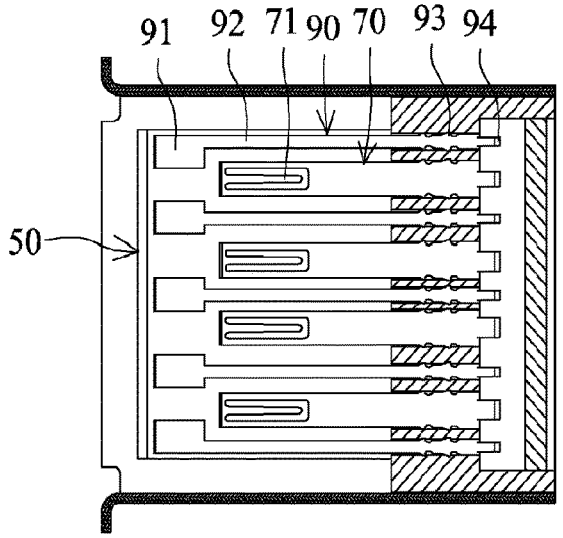
FIG. 32 is a cross-sectional bottom view showing the tenth embodiment of the invention.

As shown in FIGS. 30 to 32, the tenth embodiment of the invention is a USB 3.0 socket, which is almost the same as the fifth embodiment except for the difference to be described in the following. This embodiment also has one row of first terminals 60 and one row of second terminals 70, which have the same connection interface and have oppositely arranged serial numbers. This embodiment further has one row of first terminals 65 and one row of second terminals 90, which have the same connection interface and have oppositely arranged serial numbers.

The first terminal 65 has a first contact 66, a first extension 67, a first fixing portion 68 and a first pin 69. The one row of five first terminals 65 are disposed on the top surface of the tongue 50 and are arranged between the one row of first terminals 60. The first contacts 66 of the first terminals 65, which cannot be elastically moved, lie on the top surface of the tongue. The first contact 66 of the first terminal 65 is disposed in front of the first contact 61 of the first terminal 60.

The second terminal 90 has a second contact 91, a second extension 92, a second fixing portion 93 and a second pin 94. The one row of five second terminals 90 are disposed on the bottom surface of the tongue 50 and arranged between the one row of second terminals 70. The second contact 91 of the second terminal 90 cannot be elastically moved and lies on the top surface of the tongue. The second contact 91 of the second terminal 90 is disposed in front of the second contact 71 of the second terminal 70.

The two rows of first terminals 60 and 65 are formed by pressing the same metal sheet. The two rows of second terminals 70 and 90 are formed by pressing the same metal sheet.

Figure 34:
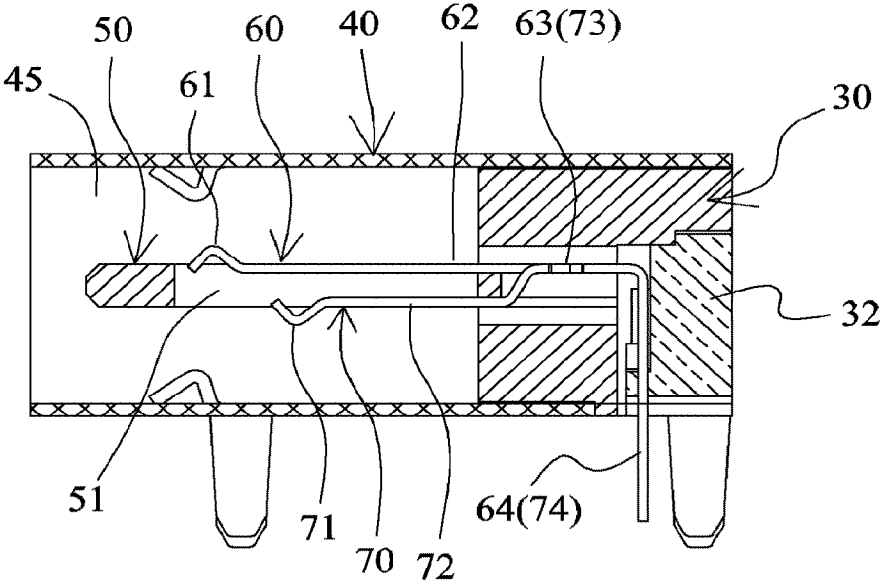
FIG. 34 is a cross-sectional side view showing the eleventh embodiment of the invention.
Figure 33:
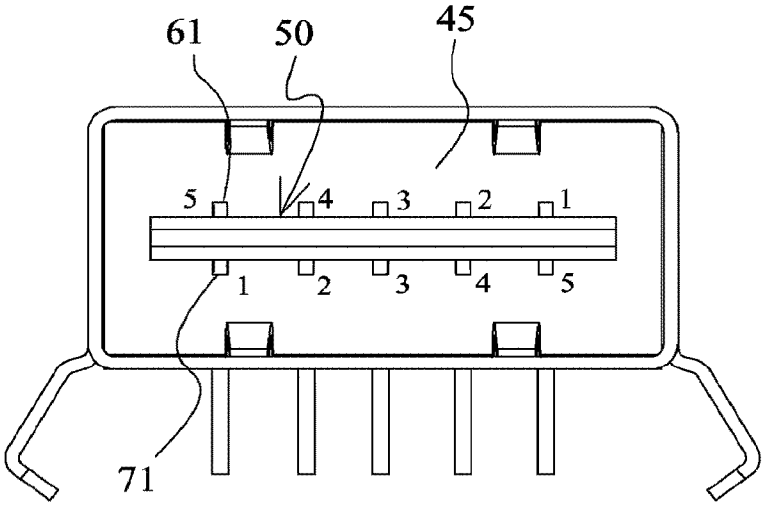
FIG. 33 is a cross-sectional front view showing an eleventh embodiment of the invention.

As shown in FIGS. 33 and 34, the eleventh embodiment of the invention is a mini USB 2.0 socket, which may allow a plug to be normally and oppositely inserted for connection. Compare with the connection interface of USB 2.0, the connection interface of the mini USB 2.0 has an additional terminal. So, the structure of this embodiment is substantially the same as the first embodiment, and similarly has a plastic base 30, a metal housing 40, a tongue 50, one row of first terminals 60 and one row of second terminals 70. The difference therebetween is that there are one row of five first terminals 60 in this embodiment, and the first terminal 60 has a first contact 61 projecting beyond the top surface of the tongue 50. There are also one row of five second terminals 70. Each second terminal has a second contact 71 projecting beyond the bottom surface of the tongue 50. The one row of second terminals 70 and the one row of first terminals 60 pertain to the same connection interface and have oppositely arranged serial numbers. The structures of the second terminal 70 and the first terminal 60 are also substantially the same as those of the first embodiment.

As shown in FIGS. 35 to 37, the twelfth embodiment of the invention is a USB 2.0 socket, which allows a plug to be normally and oppositely inserted for connection and is almost the same as the first embodiment. The socket similarly has a plastic base 30, a metal housing 40, a tongue 50, one row of first terminals 60 and one row of second terminals 70. The differences between the twelfth and first embodiments are described in the following.

Two sides of the metal housing 40 are prodded inwardly to form four laterally elastically movable elastic sheets, which include two outer elastic sheets 41 and two inner elastic sheets 42 respectively disposed above and below the tongue 50. The two inner elastic sheets 42 are disposed on inner sides of the two outer elastic sheets 41. The two inner elastic sheets 42 respectively rest against the top and bottom surfaces on one side of the tongue 50. Each elastic sheet has one end connected to a portion near the front end on the two sides of the metal housing 40 and extends inwardly in an arced manner. Each elastic sheet has a projection 46. When the projection 46 is pressed, the elastic sheet is elastically moved outwardly.

The front end of the first contact 61 of the first terminal 60 has a first guide-in sheet 611. The plate surface of the first guide-in sheet 611 is smaller than the plate surface of the first contact 61. The front end of the second contact 71 of the second terminal 70 has a second guide-in sheet 75. The plate surface of the second guide-in sheet 75 is smaller than the plate surface of the second contact 71. The first contact 61 and the second contact 71 are vertically aligned, and the first guide-in sheet 611 and the second guide-in sheet 75 are staggered in a left to right direction. Both the first guide-in sheet 611 and the second guide-in sheet 75 are hooked on the tongue 50.

Figure 39:
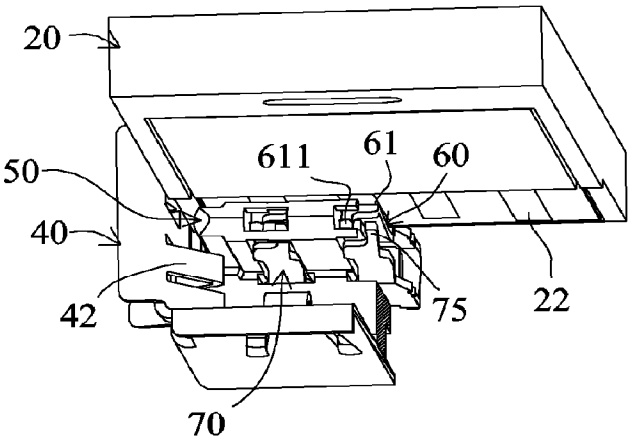

As shown in FIG. 39, when the connection terminal 22 of the light and handy mobile disk 20 is inserted downwardly into the space above the tongue 50, two elastic sheets on two sides of the top of the tongue 50 are pushed away and elastically moved outwardly, and the inner elastic sheets 42 on two sides of the bottom of the tongue rest against the bottom surface of the tongue 50. So, when the light and handy mobile disk 20 is improperly inserted to turn downwards, the inner elastic sheets 42 resting against the bottom surface of the tongue 50 can prevent the tongue 50 from being forced downwards and thus broken.

When the first contact 61 of the first terminal 60 is in elastic contact with the connection terminal 22 of the light and handy mobile disk 20 and is elastically moved downwards, the first guide-in sheet 611 cannot touch the second guide-in sheet 75 because the first guide-in sheet 611 and the second guide-in sheet 75 are staggered in a left to right direction.

Figure 38:
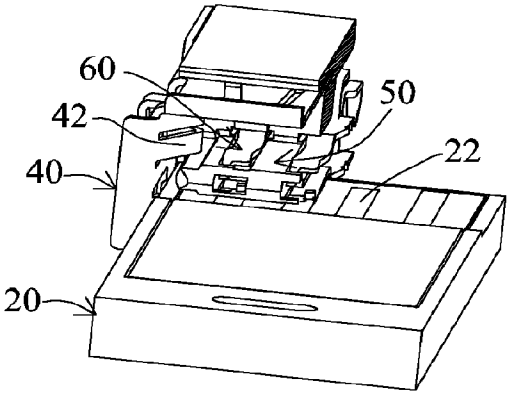

As shown in FIG. 38, when the connection terminal 22 of the light and handy mobile disk 20 is inserted upwards into the space below the tongue 50, two elastic sheets on two sides of the tongue 50 are pushed away and elastically moved outwards. Because the inner elastic sheets 42 on two sides of the top of the tongue rest against the top surface of the tongue 50, the tongue 50 is also protected and cannot be broken when the light and handy mobile disk 20 is improperly inserted.

Figure 40:
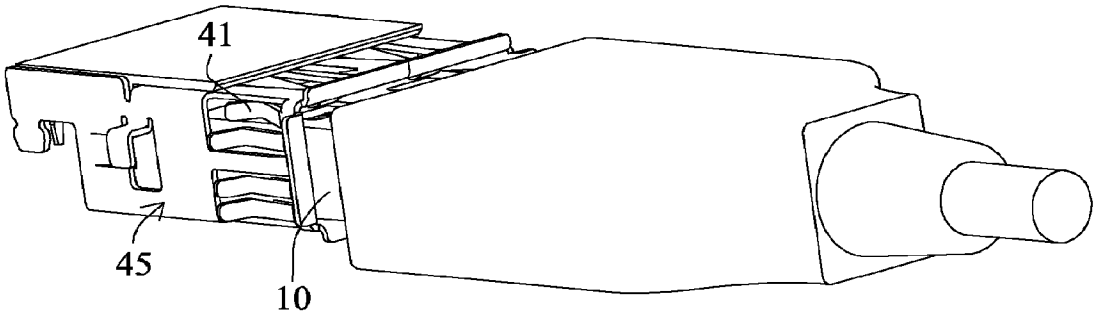
FIGS. 38 to 41 are pictorial views showing the usage states of the twelfth embodiment of the invention.

As shown in FIG. 40, when the connection terminal of the USB 2.0 plug 10 having the metal housing is inserted upwardly into the connection slot, the USB 2.0 plug 10 occupies the entire chamber below the tongue 50 but does not occupy the entire chamber above the tongue. At this time, the outer elastic sheets 41 on two sides of the top of the tongue rest against the USB 2.0 plug 10 to prevent the USB 2.0 plug 10 from being rotated upwards and thus provide the effect of protecting the tongue 50.

Figure 41:
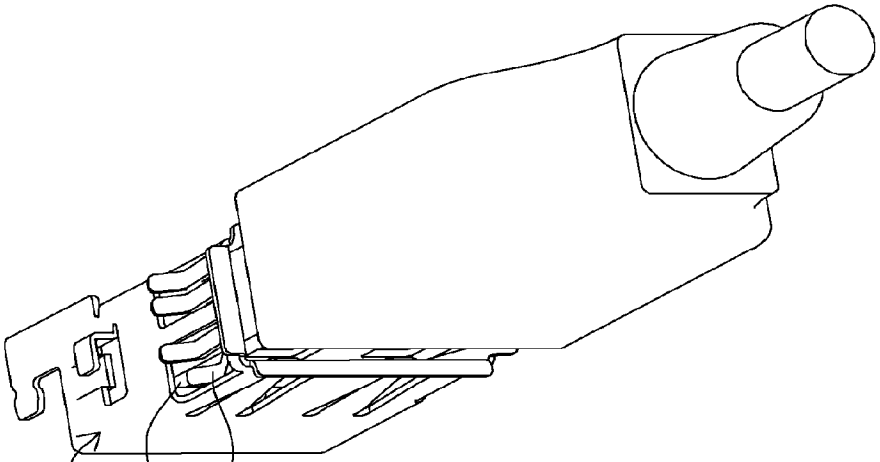

As shown in FIG. 41, when the connection terminal of the USB 2.0 plug 10 is inserted downwardly into the connection slot, the USB 2.0 plug 10 occupies the entire chamber above the tongue 50 but does not occupy the entire chamber below the tongue. At this time, the outer elastic sheets 41 on two sides of the bottom of the tongue rest against the USB 2.0 plug 10 to prevent the USB 2.0 plug 10 from being rotated upwards to achieve the effect of protecting the tongue 50.

The design of this embodiment has the effect of bidirectional insertion, and further has the effects of protecting the tongue and enlarging the contact area of the terminal.

Figure 42:
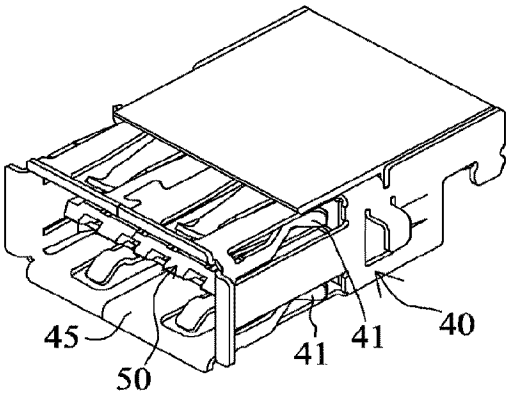
FIG. 42 is a pictorially assembled view showing a thirteenth embodiment of the invention.

As shown in FIG. 42, the thirteenth embodiment of the invention is almost the same as the twelfth embodiment except that one of two laterally elastically movable outer elastic sheets 41 is formed on each of two sides of the metal housing 40 above and below the tongue 50 by prodding the metal housing 40 inwardly.

Figure 44:
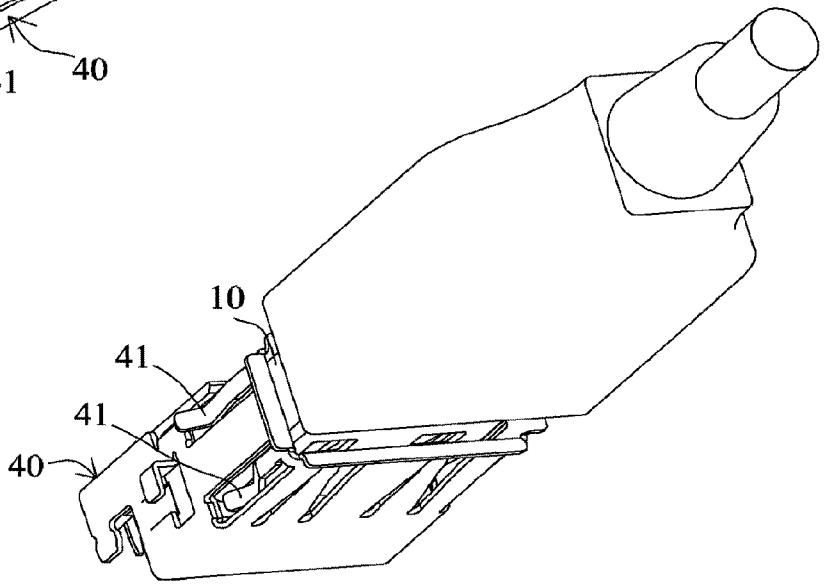
FIGS. 43 and 44 are pictorial views showing the usage states of the thirteenth embodiment of the invention.
Figure 43:
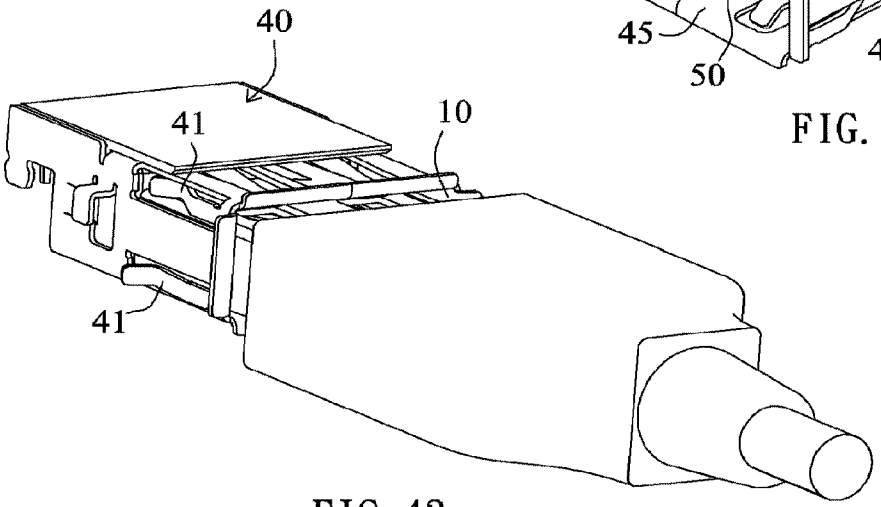

As shown in FIG. 43, when the connection terminal of the USB 2.0 plug 10 is inserted upwardly into the connection slot, the outer elastic sheets 41 on two sides of the top of the tongue rest against the USB 2.0 plug 10. As shown in FIG. 44, when the connection terminal of the USB 2.0 plug 10 is inserted downwardly into the connection slot, the outer elastic sheets 41 on two sides of the bottom of the tongue rest against the USB 2.0 plug 10.

Figure 45:
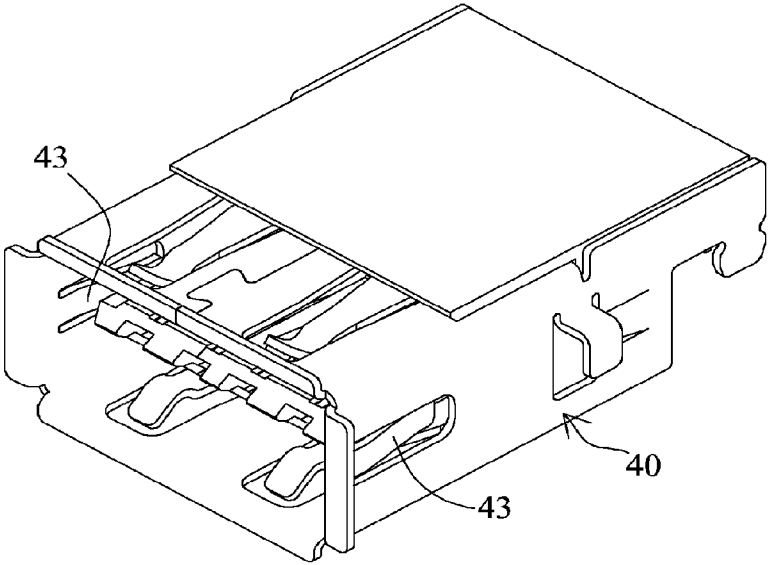
FIG. 45 is a pictorially assembled view showing a fourteenth embodiment of the invention.

As shown in FIG. 45, the fourteenth embodiment of the invention is almost the same as the twelfth embodiment except that each of two sides of the metal housing 40 is prodded inwardly to form a laterally elastically movable middle elastic sheet 43. The middle elastic sheet 43 is disposed at a middle height on one side of the connection slot 45 and has the structure the same as that of the outer elastic sheet 41.

Figure 47:
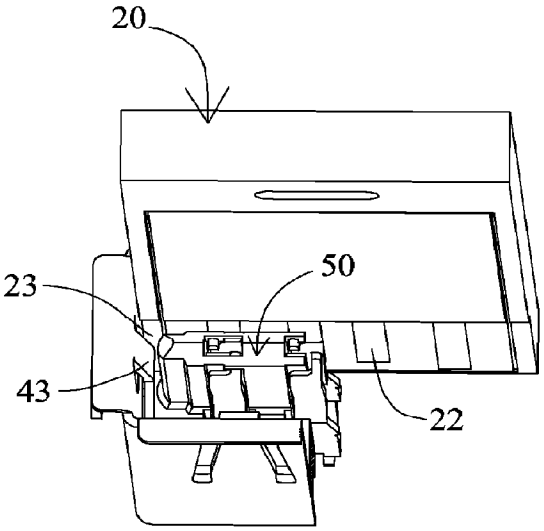
FIGS. 46 and 47 are pictorial views showing the usage states of the fourteenth embodiment of the invention.
Figure 46:
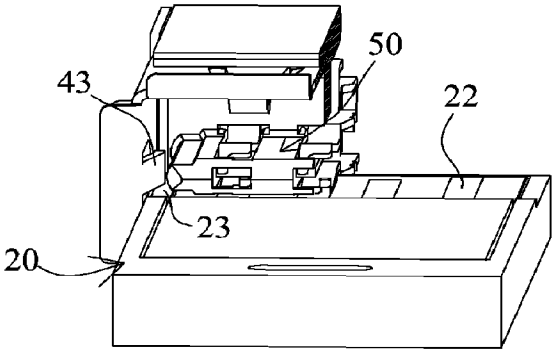

As shown in FIG. 46, when the connection terminal of the light and handy mobile disk 20 is inserted upwardly into the connection slot 45, the middle elastic sheets 43 on two sides of the tongue rest against one surface 23 of the light and handy mobile disk 20 formed with the connection terminal to prevent the light and handy mobile disk 20 from being rotated upwards. As shown in FIG. 47, when the connection terminal of the light and handy mobile disk 20 is inserted downwardly into the connection slot, the middle elastic sheets 43 on two sides of the tongue rest against one surface of the light and handy mobile disk 20 formed with the connection terminal to prevent the light and handy mobile disk 20 from being rotated downwards.

Figure 48:
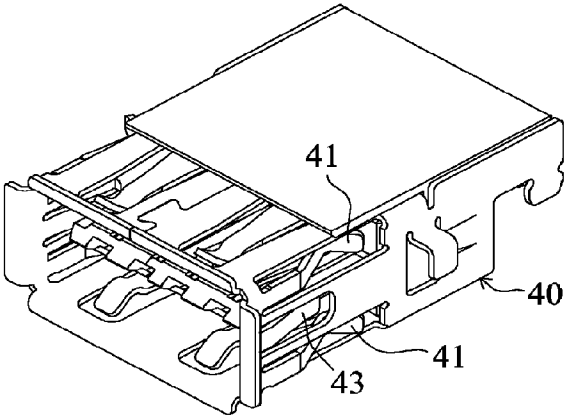
FIG. 48 is a pictorially assembled view showing a fifteenth embodiment of the invention.

As shown in FIG. 48, the fifteenth embodiment of this invention is almost the same as the thirteenth and fourteenth embodiments. That is, each of two sides of the metal housing 40 is prodded inwardly to form a middle elastic sheet 43 and two outer elastic sheets 41, which are laterally elastically movable.

Figure 49:
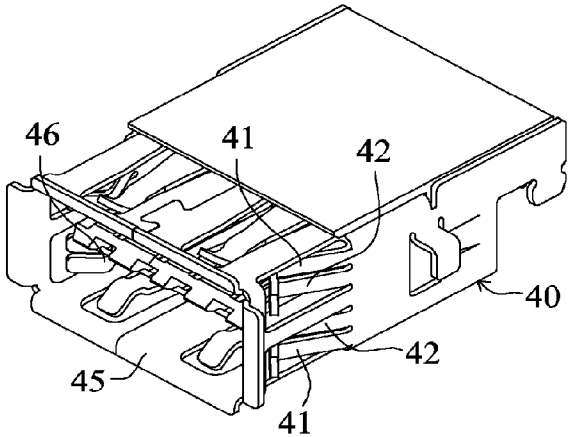
FIG. 49 is a pictorially assembled view showing a sixteenth embodiment of the invention.

As shown in FIG. 49, the sixteenth embodiment of the invention is almost the same as the twelfth embodiment except that one end of the outer elastic sheet 41 and one end of the inner elastic sheet 42 are connected to two side plate surfaces of the metal housing 40 and extend outwardly in an arced manner. Each elastic sheet has a projection 46. When the projection 46 is pressed, the elastic sheet is elastically moved outwardly.

Figure 50:
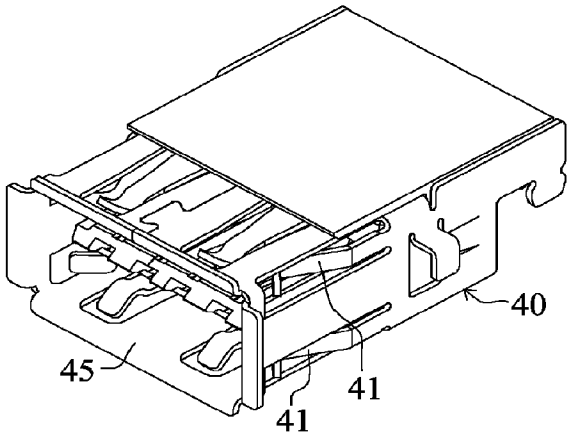
FIG. 50 is a pictorially assembled view showing a seventeenth embodiment of the invention.

As shown in FIG. 50, the seventeenth embodiment of the invention is almost the same as the thirteenth embodiment except that the one end of the outer elastic sheet 41 of this embodiment is connected to the middle plate surface on each of two sides of the metal housing 40 and extends outwardly in an arced manner.

Figure 51:
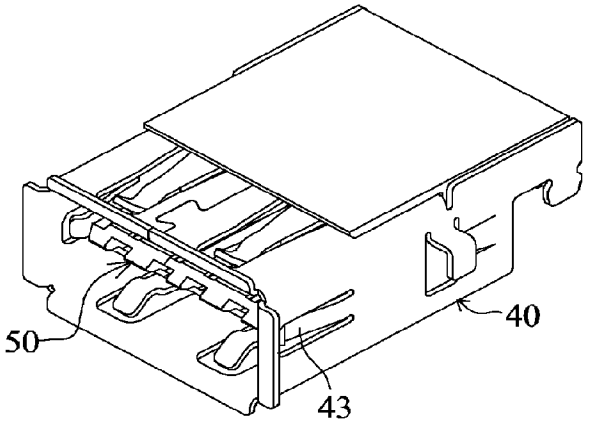
FIG. 51 is a pictorially assembled view showing an eighteenth embodiment of the invention.

As shown in FIG. 51, the eighteenth embodiment of the invention is almost the same as the fourteenth embodiment except that one end of the middle elastic sheet 43 of this embodiment is connected to the middle plate surface on each of two sides of the metal housing 40 and extends outwardly in an arced manner.

Figures 52, 53:
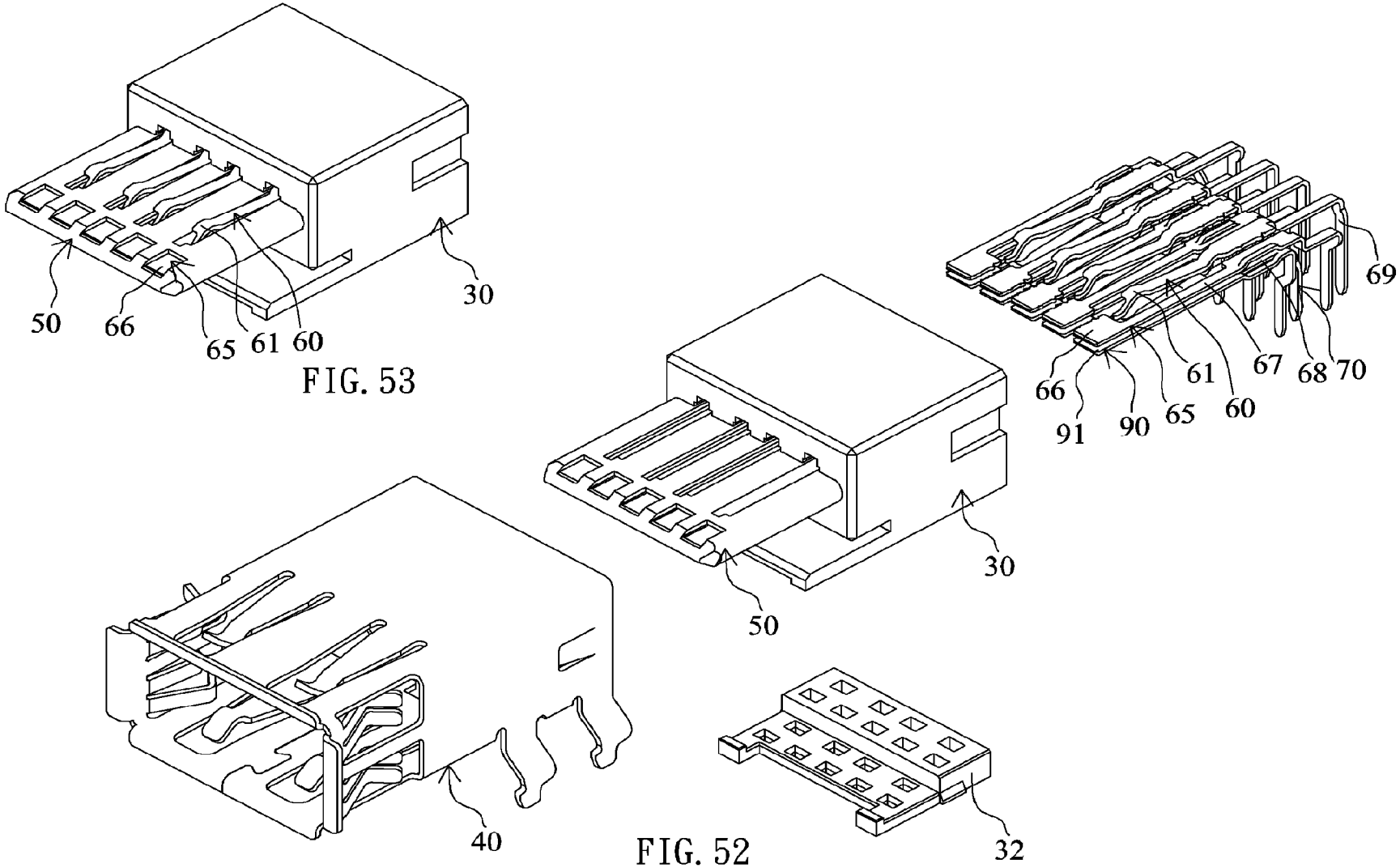
FIG. 52 is a pictorially exploded view showing a nineteenth embodiment of the invention.
FIG. 53 is a pictorially assembled view showing terminals and a plastic base of the nineteenth embodiment of the invention.

As shown in FIGS. 52 and 53, the nineteenth embodiment of the invention is a USB 3.0 socket, which allows the plug to be inserted normally and oppositely, and is almost the same as the twelfth embodiment except that this embodiment additionally has one row of first terminals 65 and one row of second terminals 90. The contact 66 of the first terminal 65 lies on the top surface of the tongue 50 and is disposed in front of the contact 61 of the first terminal 60 on the same surface. The contact 91 of the second terminal 90 lies on the bottom surface of the tongue 50 and is disposed in front of the contact of the second terminal 70 on the same surface.

Figure 54:
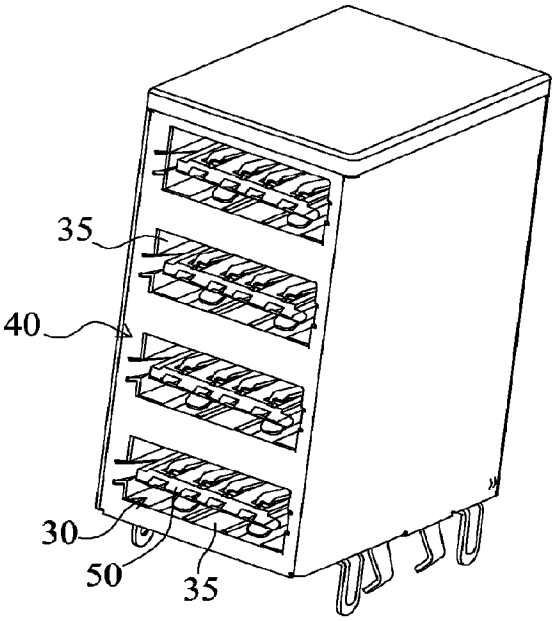
FIG. 54 is a pictorially assembled view showing a $20^{th}$ embodiment of the invention.

As shown in FIG. 54, the 20$^{th}$ embodiment of the invention is almost the same as the twelfth embodiment except that the embodiment is a four-layer USB 2.0 socket that allows the USB plug to be normally and oppositely inserted for connection. That is, the plastic base 30 has four connection slots 35, and the metal housing 40 has four openings corresponding to the four connection slots 35.

Figure 55:
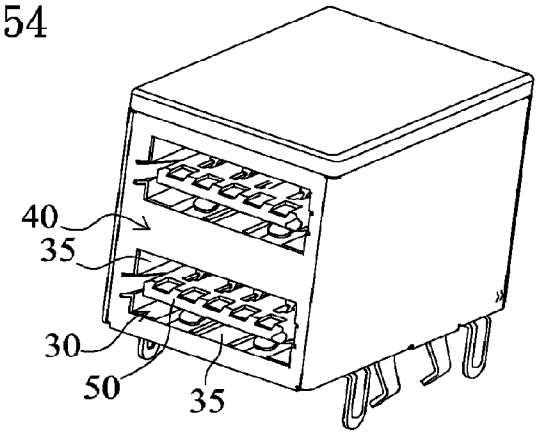
FIG. 55 is a pictorially assembled view showing a $21^{st}$ embodiment of the invention.

As shown in FIG. 55, the 21$^{st}$ embodiment of the invention is almost the same as the nineteenth embodiment except that this embodiment is a two-layer USB 3.0 socket that allows the plug to be normally and oppositely inserted. That is, the plastic base 30 has two connection slots 35, and the metal housing 40 has two openings corresponding to the four connection slots 35.

Figure 56:
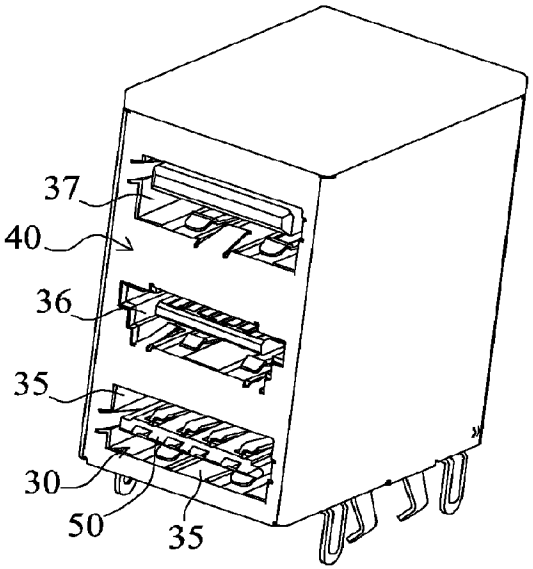
FIG. 56 is a pictorially assembled view showing a $22^{nd}$ embodiment of the invention.

As shown in FIG. 56, the 22$^{nd}$ embodiment of the invention is almost the same as the 20$^{th}$ embodiment except that this embodiment is a three-layer stacked socket. That is, the plastic base has, from bottom to top, a connection slot 35, a connection slot 36 and a connection slot 37. The metal housing 40 has three openings corresponding to the three connection slots, wherein the lowest slot is the connection slot 35 of the USB 3.0 socket that allows the plug to be normally and oppositely inserted, the middle slot is the connection slot 36 of the socket shared by the USB 3.0 and eSATA (External Serial ATA) plugs, and the upper slot is the connection slot 37 of the USB 2.0 socket that allows the plug to be inserted unidirectionally.

Figure 57:
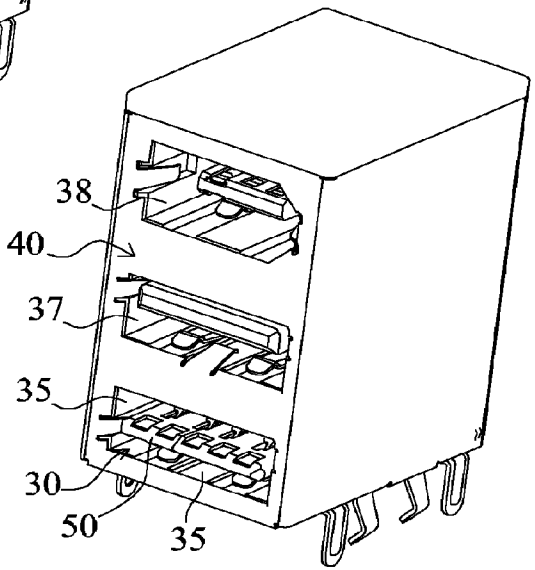
FIG. 57 is a pictorially assembled view showing a $23^{rd}$ embodiment of the invention.

As shown in FIG. 57, the 23$^{rd}$ embodiment of the invention is almost the same as the 21$^{st}$ embodiment except that this embodiment is a three-layer stacked socket. That is, the plastic base has, from bottom to top, a connection slot 35, a connection slot 37 and a connection slot 38. The metal housing 40 has three openings corresponding to the three connection slots, wherein the lowest connection slot 35 allows the USB 3.0 plug to be normally and oppositely inserted for connection, the middle connection slot 37 allows the USB 2.0 plug to be unidirectionally inserted for connection, and the upper connection slot 38 allows the 1394 plug to be inserted.

Figure 58:
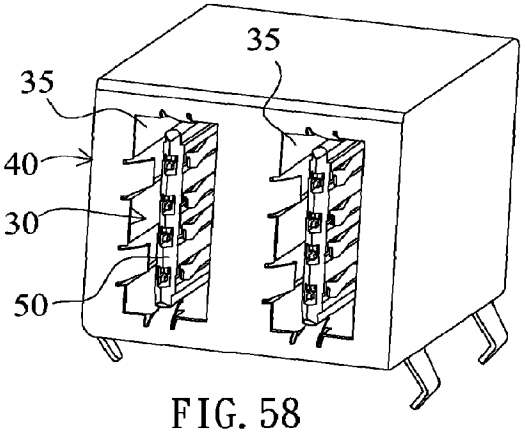
FIG. 58 is a pictorially assembled view showing a $24^{th}$ embodiment of the invention.

As shown in FIG. 58, the 24$^{th}$ embodiment of the invention is a dual-slot USB 2.0 socket for bidirectional insertion and connection and is almost the same as the eighth embodiment except that the two connection slots 35 of this embodiment are arranged from left to right and have the insertion ports facing frontward, and the tongues 50 in the connection slots 35 are in the upright state.

Figure 59:
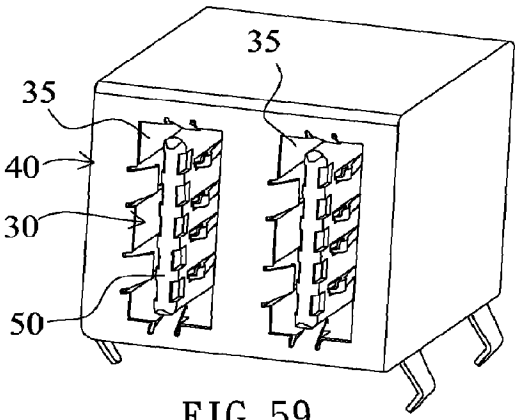
FIG. 59 is a pictorially assembled view showing a $25^{th}$ embodiment of the invention.

As shown in FIG. 59, the 25$^{th}$ embodiment of the invention is a dual-slot USB 3.0 socket for bidirectional insertion and connection and is almost the same as the 24$^{th}$ embodiment. The two connection slots 35 are also arranged from left to right, and the tongues 50 in the connection slots 35 are in the upright state.

Figure 60:
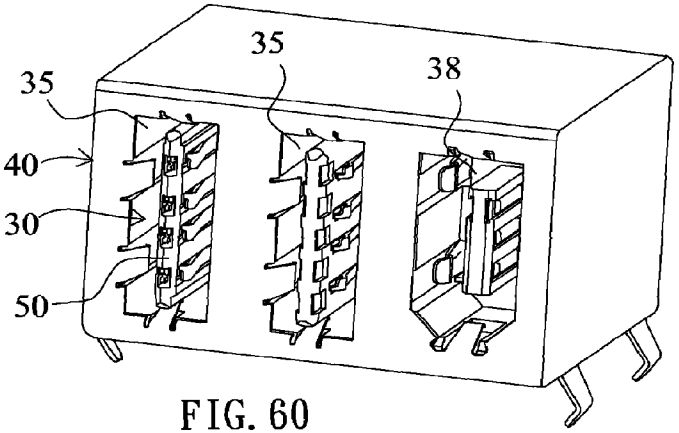
FIG. 60 is a pictorially assembled view showing a $26^{th}$ embodiment of the invention.

As shown in FIG. 60, the 26$^{th}$ embodiment of the invention includes three sockets arranged from left to right and is almost the same as the 25$^{th}$ embodiment except that the leftmost connection slot 35 corresponds to the USB 2.0 socket for bidirectional insertion and connection, the middle connection slot 35 corresponds to the USB 3.0 socket for bidirectional insertion and connection, and the rightmost connection slot 38 corresponds to the 1394 socket.

Figure 61:
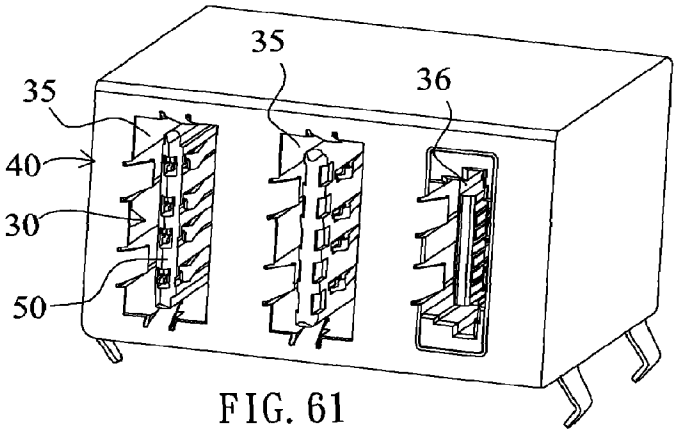
FIG. 61 is a pictorially assembled view showing a $27^{th}$ embodiment of the invention.

As shown in FIG. 61, the 27$^{th}$ embodiment of the invention has three sockets arranged from left to right and is almost the same as the 26$^{th}$ embodiment except that the rightmost connection slot 36 is shared by the USB 3.0 and eSATA plugs.

Figures 62, 63, 64, 65:
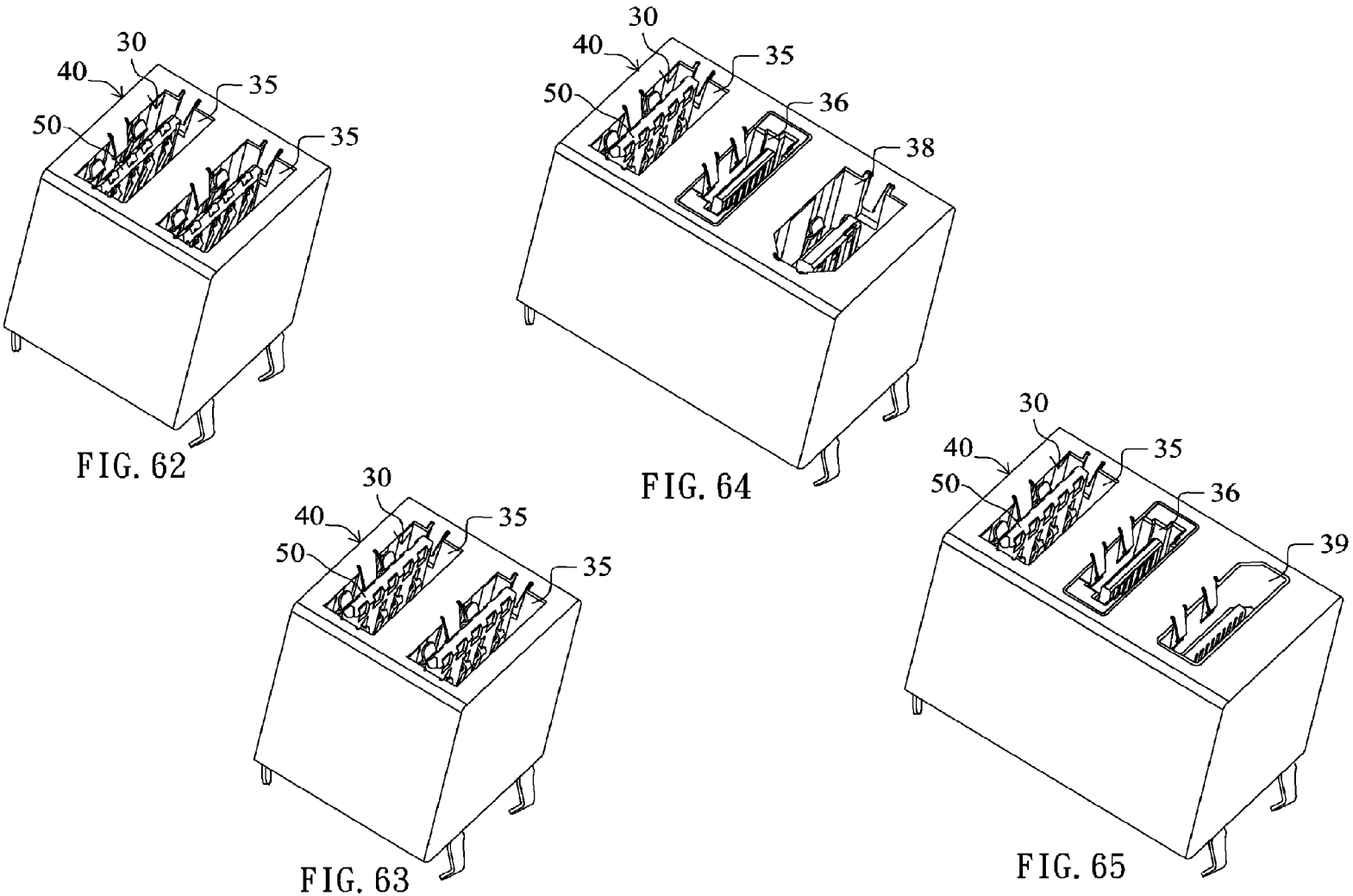
FIG. 62 is a pictorially assembled view showing a $28^{th}$ embodiment of the invention.
FIG. 63 is a pictorially assembled view showing a $29^{th}$ embodiment of the invention.
FIG. 64 is a pictorially assembled view showing a $30^{th}$ embodiment of the invention.
FIG. 65 is a pictorially assembled view showing a $31^{st}$ embodiment of the invention.

As shown in FIG. 62, the 28$^{th}$ embodiment of the invention is a dual-slot USB 2.0 socket for bidirectional insertion and connection, and is almost the same as the 24$^{th}$ embodiment except that this embodiment has upright slots 35, and the insert ports of the connection slots 35 face upwards.

As shown in FIG. 63, the 29$^{th}$ embodiment of the invention is almost the same as the 28$^{th}$ embodiment except that this embodiment is a dual-slot USB 3.0 socket for bidirectional insertion and connection.

As shown in FIG, 64, the 30$^{th}$ embodiment of the invention is almost the same as the 29$^{th}$ embodiment except that this embodiment contains three upright slots. The leftmost connection slot 35 corresponds to the USB 3.0 socket for bidirectional insertion and connection, the middle connection slot 36 corresponds to the socket shared by the USB 3.0 and eSATA plugs, and the rightmost connection slot 38 corresponds to the 1394 socket.

As shown in FIG. 65, the 31$^{st}$ embodiment of the invention is almost the same as the 30$^{th}$ embodiment except that the rightmost connection slot 39 of this embodiment is shared by the HDMI (High Definition Multimedia Interface) and display ports.

Figure 66:
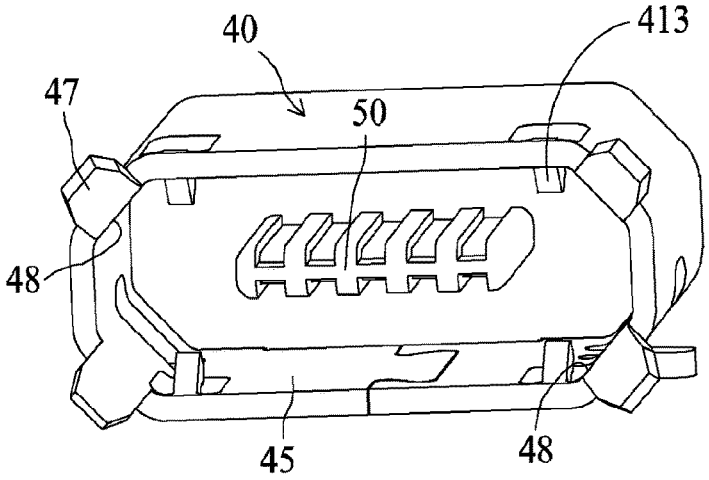
FIG. 66 is a pictorially assembled view showing a 32$^{nd}$ embodiment of the invention.
Figure 67:
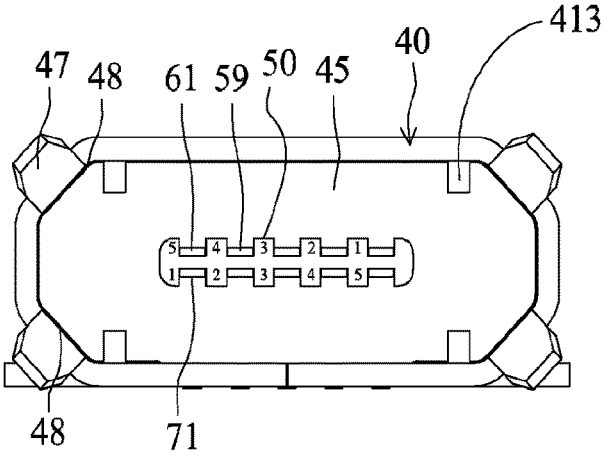
FIG. 67 is a front view showing the 32$^{nd}$ embodiment of the invention.
Figure 68:
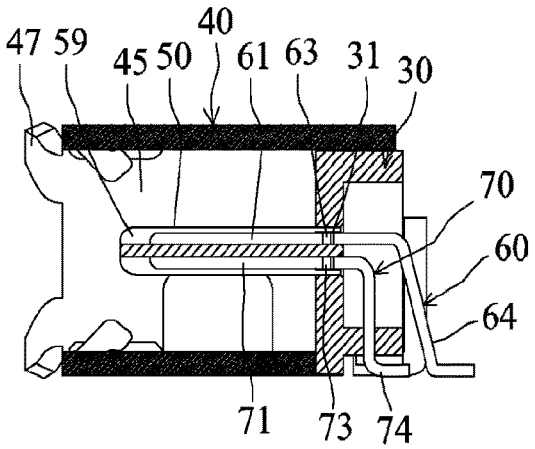
FIG. 68 is a cross-sectional side view showing the 32$^{nd}$ embodiment of the invention.

As shown in FIGS. 66 to 68, the 32$^{nd}$ embodiment of the invention is a micro USB 2.0 socket, which includes a plastic base 30, a metal housing 40, one row of first terminals 60 and one row of second terminals 70.

The plastic base 30 has two rows of terminal slots 31. The front end of the terminal slot 31 is integrally formed with a projecting tongue 50, and each of the top and bottom surfaces of the tongue 50 is formed with five terminal slots 59 separately arranged.

The metal housing 40 covers the plastic base 30, the front section of the metal housing 40 is formed with a connection slot 45, and the connection slot 45 is disposed on the front end of the plastic base 30 and covers the tongue 50 therein. The top and bottom ends are narrower than the middle section so that the four corners of its profile are formed with symmetric sloped edges 48, and the top, bottom, left and right sides of the tongue 50 are formed with compatible and symmetrical profiles. Thus, a micro USB 2.0 plug may be bidirectionally inserted for connection. In addition, each of the top and bottom plates of the metal housing 40 is prodded to form two elastic locks 413, and each of four sloped edges 48 of the front end of the connection slot 45 is formed with a slant guiding plate 47 expanding outwards. When the micro USB plug is inserted into the connection slot and touches the slant guiding plate 47, it is guided toward the center of the connection slot.

The one row of first terminals 60 have five first terminals. Each first terminal 60 has a first contact 61, a first fixing portion 63 and a first pin 64. The first fixing portions 63 are fixed to the upper row of terminal slots 31 of the plastic base 30. The first contact 61 cannot be elastically moved but lies in the terminal slot 59 on the top surface of the tongue 50. The first pin 64 extends out of the bottom of the plastic base 30.

The one row of second terminals 70 have five terminals. Each second terminal 70 has a second contact 71, a second fixing portion 73 and a second pin 74. The second fixing portions 73 are fixed to the lower row of terminal slots 31 of the plastic base 30. The second contact 71 cannot be elastically moved and lies in the terminal slot 59 on the bottom of the tongue 50. The second pin 74 extends out of the plastic base 30 to the bottom thereof. The at least one row of first contacts 61 and the at least one row of second contacts 71 pertain to the same connection interface and have oppositely arranged serial numbers. That is, the one row of second contacts 71 have the serial numbers of 1, 2, 3, 4 and 5 from left to right, and the one row of first contacts 61 have the serial numbers of 5, 4, 3, 2 and 1 from left to right.

Figure 69:
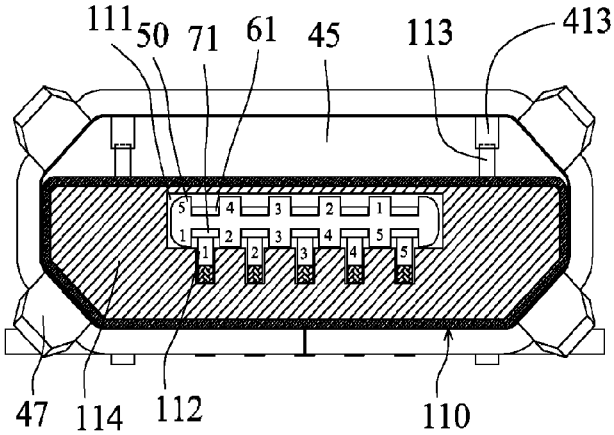
FIGS. 69 to 71 show the usage states of the 32$^{nd}$ embodiment of the invention.
Figure 70:
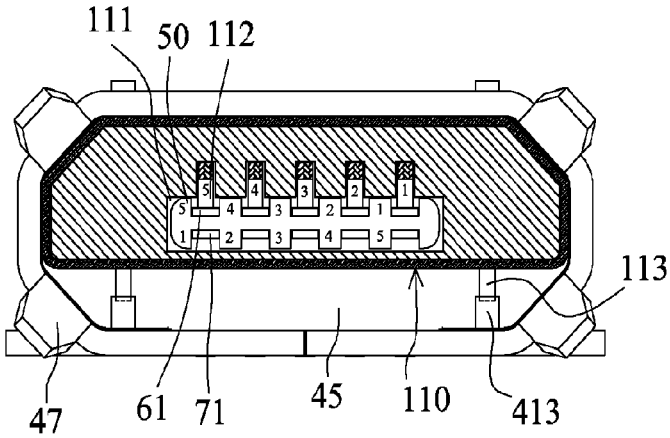

According to the above-mentioned structure, as shown in FIG. 69, the micro USB 2.0 plug 110 has a plastic base 114 and a metal casing covering the plastic base 114. The plastic base 114 has a connection slot 111 and one row of five connection terminals 112, and two elastic locks 113 on the top end surface. When the connection terminals 112 of the micro USB 2.0 plug 110 are upwardly and normally inserted into the connection slot 45, the connection slot 111 of the micro USB 2.0 plug is fitted with the tongue 50, and its one row of connection terminals 112 are electrically connected to the one row of second contacts 71 on the bottom side of the tongue 50. The two elastic projecting hooks 113 may hook on the rear sides of the elastic locks 413 of the top plate of the metal housing 40. As shown in FIG. 70, when the connection terminal 112 of the micro USB 2.0 plug 110 is downwardly and oppositely inserted into the connection slot 45, the one row of connection terminals 112 are electrically connected to the one row of first contacts 61 on the top surface of the tongue 50, and the two elastic locks 113 may engage with the rear sides of the two elastic locks 413 of the bottom plate of the metal housing 40. According to the above-mentioned description, it is obtained that the embodiment can allow the micro USB 2.0 plug 110 to be normally and oppositely inserted for electrical connection.

Figure 71:
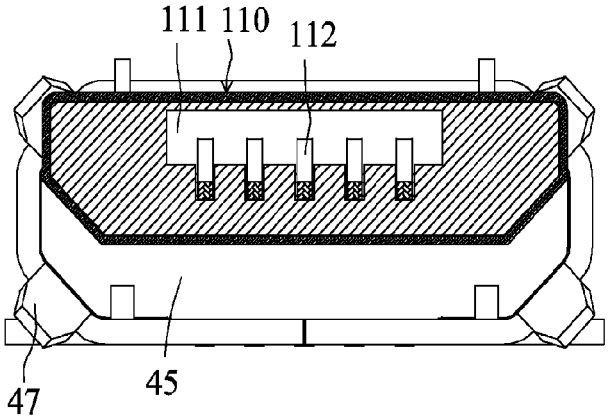

As shown in FIG. 71, when the micro USB 2.0 plug 110 is inserted into the connection slot 45 but is biased upward and not aligned with the slot, the micro USB 2.0 plug 110 touches the slant guiding plates 47 of two corners on the top of the connection slot 45. The micro USB 2.0 plug 110 is guided, by the slant surface of the slant guiding plate 47, to the center of the connection slot 45 so that the plug may be inserted in an aligned manner and the convenience in use may be obtained.

Figure 72:
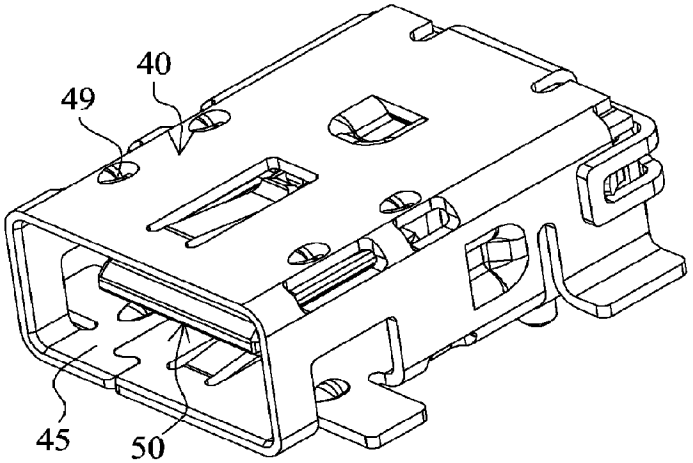
FIG. 72 is a pictorially assembled view showing a 33$^{rd}$ embodiment of the invention.
Figure 73:
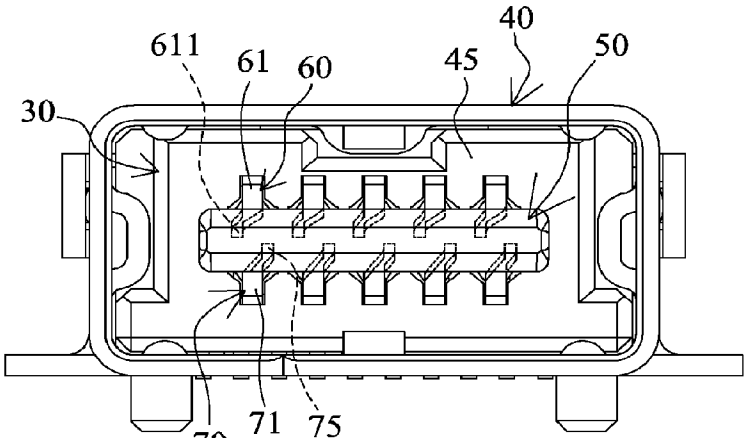
FIG. 73 is a front view showing the 33$^{rd}$ embodiment of the invention.

As shown in FIGS. 72 and 73, the 33$^{rd}$ embodiment of the invention is a mini USB 2.0 socket for bidirectional insertion and connection. The structure of this embodiment is almost the same as the structure of the eleventh embodiment and includes a plastic base 30, a metal housing 40, a tongue 50, one row of first terminals 60 and one row of second terminals 70. The difference therebetween is that the front sections of the top and bottom plate surfaces of the metal housing 40 of this embodiment are formed with four projections 49 projecting toward the connection slot 45. In addition, the structures of the one row of first terminals 60 and the one row of second terminals 70 are the same as the structures of the twelfth embodiment of FIG. 35. That is, the front end of the contact 61 of the first terminal 60 is formed with a downward guide-in sheet 611. The plate surface of the guide-in sheet 611 is smaller than the contact 61. The front end of the second contact 71 of the second terminal 70 is formed with an upward guide-in sheet 75. The plate surface of the guide-in sheet 75 is smaller than the contact 71. The guide-in sheets 611 and the guide-in sheets 75 are staggered in a left to right direction.

Figure 74:
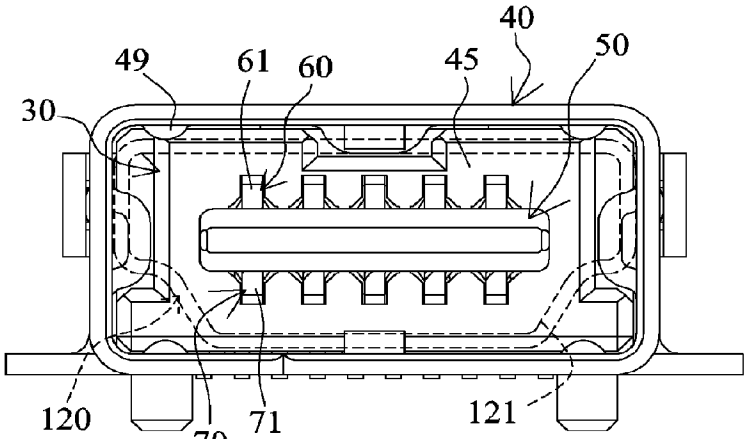
FIGS. 74 and 75 show the usage states of the 33$^{rd}$ embodiment of the invention.

As shown in FIG. 74, when the mini USB 2.0 plug 120 is normally inserted into the socket, four projections 49 on the top plate of the metal housing 40 push the mini USB 2.0 plug 120 downwards to prevent the metal casing 121 of the mini USB 2.0 plug 120 from touching the second terminal 70 to cause the short-circuited condition.

Figure 75:
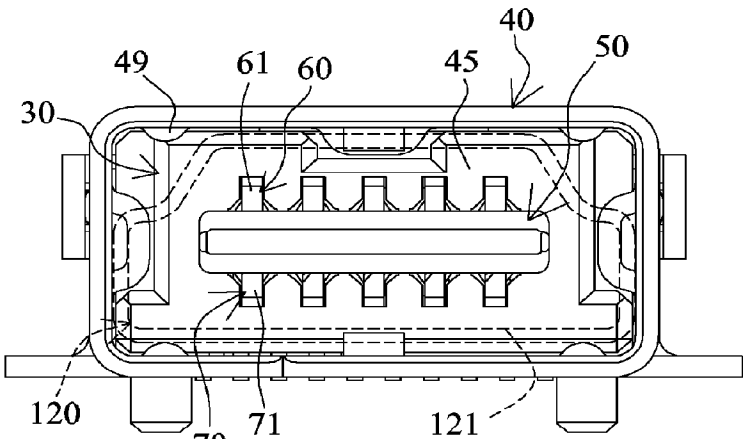

As shown in FIG. 75, when the mini USB 2.0 plug 120 is oppositely inserted into the socket, the four projections 49 on the bottom plate of the metal housing 40 push the mini USB 2.0 plug 120 upwards to prevent the metal casing 121 of the mini USB 2.0 plug 120 from touching the first terminal 60 to cause the short-circuited condition.

Figure 76:
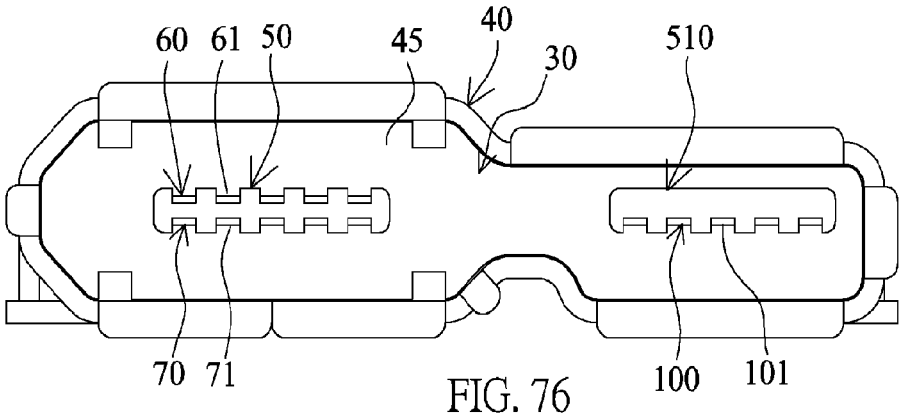
FIG. 76 is a front view showing a 34$^{th}$ embodiment of the invention.

As shown in FIG. 76, the 34$^{th}$ embodiment of the invention is a micro USB socket for the bidirectional insertion and connection of the micro USB 2.0 plug and the unidirectional insertion and connection of the micro USB 3.0 plug. The structure of this embodiment is almost the same as the 32$^{nd}$ embodiment except that the plastic base 30 and the metal housing 40 of this embodiment are wider than those of the 32$^{nd}$ embodiment. The front section of the metal housing 40 is also formed with the wider connection slot 45. The socket of this embodiment further has a second tongue 510 and one row of five third terminals 100. The second tongue 510 integrally projects beyond the front end of the plastic base 30. The second tongue 510 and the tongue 50 are located on the same level and in parallel. However, the chambers above and below the second tongue 510 are not compatible with each other. The lower chamber is larger than the upper chamber. The chambers on the left and right sides of the connection slot 45 are not compatible. The one row of third terminals 100 are fixed to the plastic base 30. The third terminals 100 have third contacts 101 separately arranged on the bottom surface of the second tongue 510, and have pins extending out of the plastic base.

Figure 77:
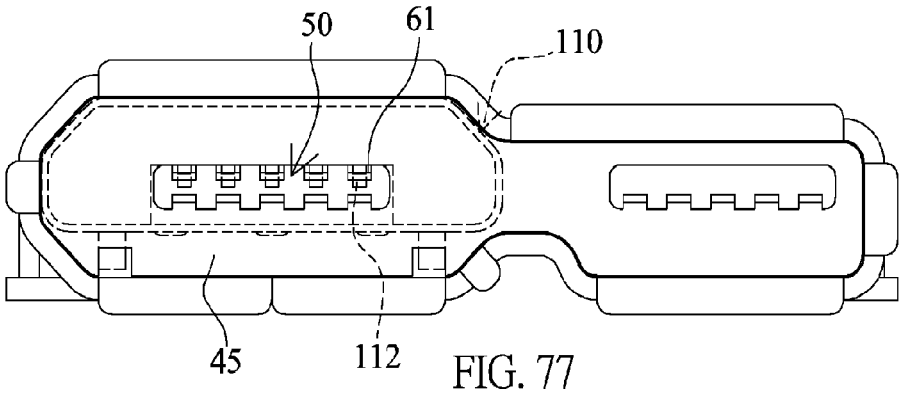
FIGS. 77 to 79 show the usage states of the 34$^{th}$ embodiment of the invention.

As shown in FIG. 77, when the micro USB 2.0 plug 110 is oppositely inserted into the connection slot 45, the connection terminal 112 of the micro USB 2.0 plug 110 is electrically connected to the first contact portion 61 on the top of the tongue 50.

Figure 78:
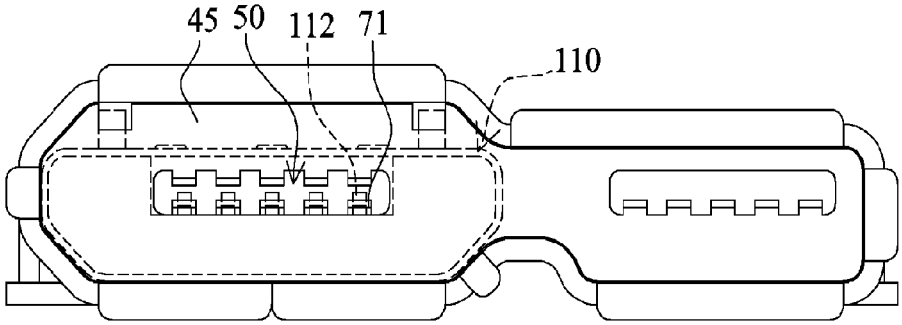

As shown in FIG. 78, when the micro USB 2.0 plug 110 is normally inserted into the connection slot 45, the connection terminal 112 of the micro USB 2.0 plug 110 is electrically connected to the second contact portion 71 on the bottom of the tongue 50.

Figure 80:
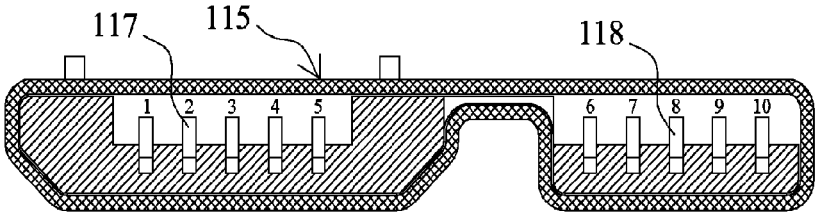
FIG. 80 is a cross-sectional view showing a micro USB 3.0 plug.

FIG. 80 is a cross-sectional view showing a micro USB 3.0 plug 115, which is almost the same as the micro USB 2.0 plug, and includes one row of five elastically movable connection terminals 117 on the left side, and one row of five elastically movable connection terminals 118 on the right side.

Figure 79:
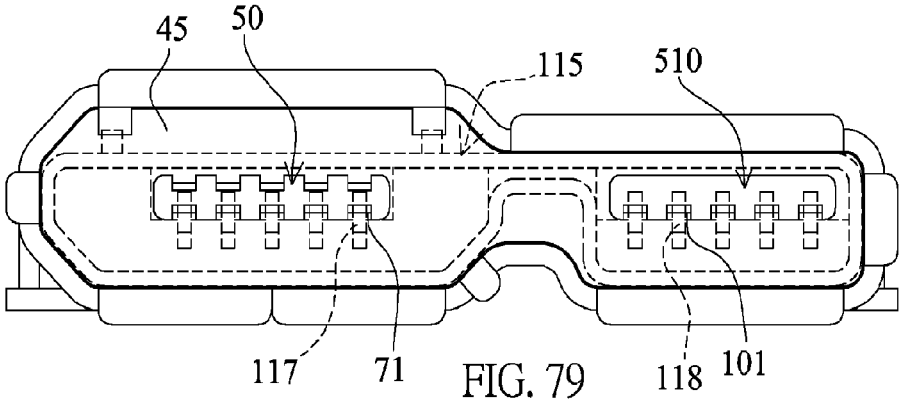

As shown in FIG. 79, when the micro USB 3.0 plug 115 is normally inserted into the connection slot 45, the one row of connection terminals 117 of the micro USB 3.0 plug 115 are electrically connected to one row of second contact portions 71 on the bottom of tongue 50, and the other row of connection terminals 118 of the micro USB 3.0 plug 115 are electrically connected to one row of third contact portions 101 on the bottom of the tongue 510.

Figure 81:
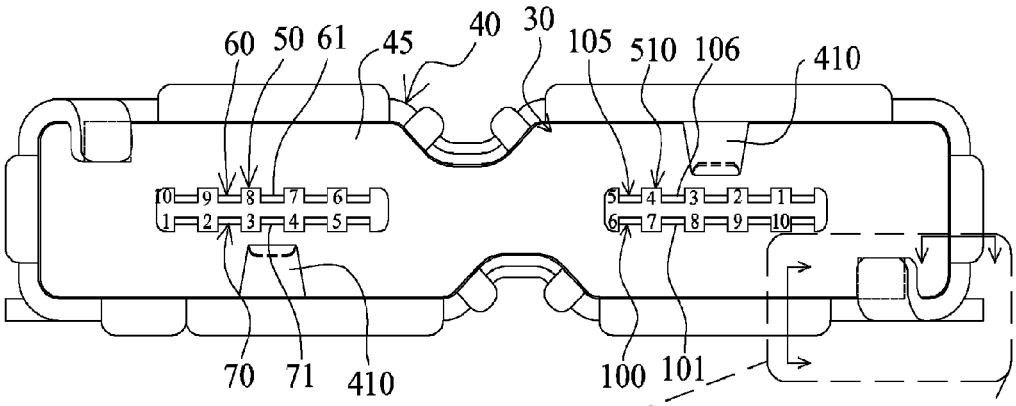
FIG. 81 is a front view showing a 35$^{th}$ embodiment of the invention.

As shown in FIG. 81, the 35$^{th}$ embodiment of the invention is a micro USB 3.0 socket for bidirectional insertion and connection of the micro USB 3.0 plug. The structure of this embodiment is almost the same as that of the 34$^{th}$ embodiment except that the chambers above and below the second tongue 510 are compatible and symmetrical, and the chambers on the left and right sides of the connection slot 45 are also compatible and symmetrical. The structure of this embodiment further has one row of five fourth terminals 105 fixed to the plastic base 30. The fourth terminals 105 have fourth contacts 106 separately arranged on the top surface of the second tongue 510 and have pins extending out of the plastic base. The one row of first contacts 61 and the at least one row of third contacts 101 pertain to the same connection interface and have oppositely arranged serial numbers. As shown in FIG. 81, the one row of first contacts 61 have the serial numbers of 10, 9, 8, 7 and 6 from left to right, and the one row of third contacts 101 have the serial numbers of 6, 7, 8, 9 and 10 from left to right. The one row of second contacts 71 and the one row of fourth contacts 106 pertain to the same connection interface and have oppositely arranged serial numbers. The one row of second contacts 71 have the serial numbers of 1, 2, 3, 4 and 5 from left to right, and the one row of fourth contacts 106 have the serial numbers of 5, 4, 3, 2 and 1 from left to right.

In addition, each of the top and bottom plates of the metal housing 40 is prodded to form with elastic pressing sheet 410 symmetrically arranged on the left and right sides. A positioning projection 412 and a guide-in slant sheet 411 are formed near two lateral sides. The elastic pressing sheet 410 extends inwards. Two sides of the two positioning projections 412 are separated from the metal housing 40, and the front and rear ends of the two positioning projections 412 are connected to the metal housing 40. When the micro USB 3.0 plug 115 is normally inserted into the connection slot 45, the two guide-in slant sheets 411 may assist in guiding the plug.

Figure 82:
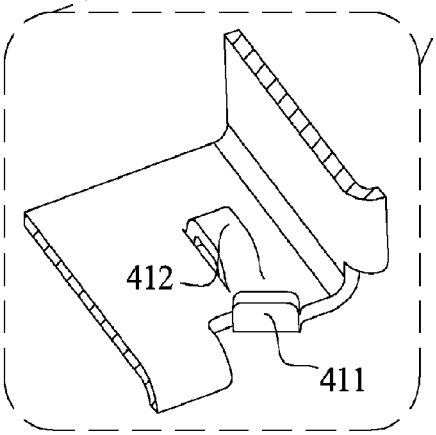
FIGS. 82 and 83 show the usage states of the 35$^{th}$ embodiment of the invention.
Figure 82:
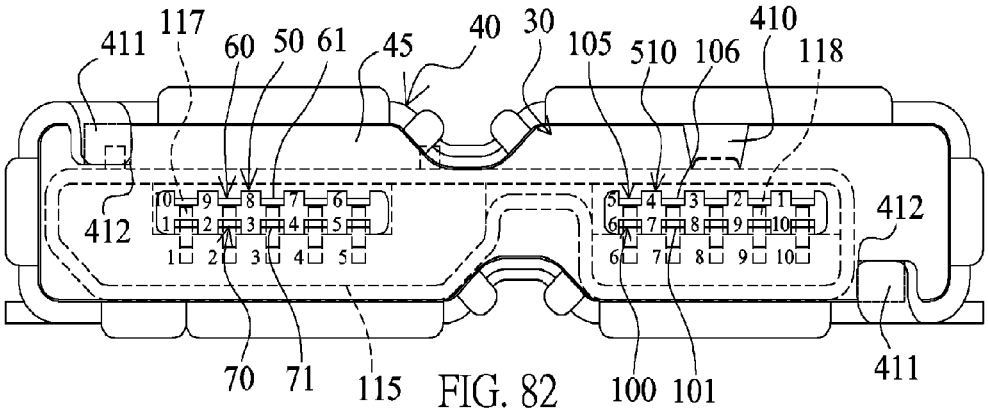

As shown in FIG. 82, when the micro USB 3.0 plug 115 is normally inserted into the connection slot 45, the one row of connection terminals 117 of the micro USB 3.0 plug 115 are electrically connected to one row of second contact portions 71 on the bottom of the tongue 50. The other row of connection terminals 118 of the micro USB 3.0 plug 115 are electrically connected to one row of third contact portions 101 on the bottom of the tongue 510. The ten connection terminals are correspondingly electrically connected to the contact portions, wherein the connection terminal and the contact portion connected together have the same serial number. At this time, the elastic pressing sheet 410 and the positioning projection 412 of the top plate of the metal housing 40 may rest against the micro USB 3.0 plug 115 to form the better positioning effect. The positioning projection 412 of the bottom plate of the metal housing 40 may be positioned on one side of the micro USB 3.0 plug 115.

Figure 83:
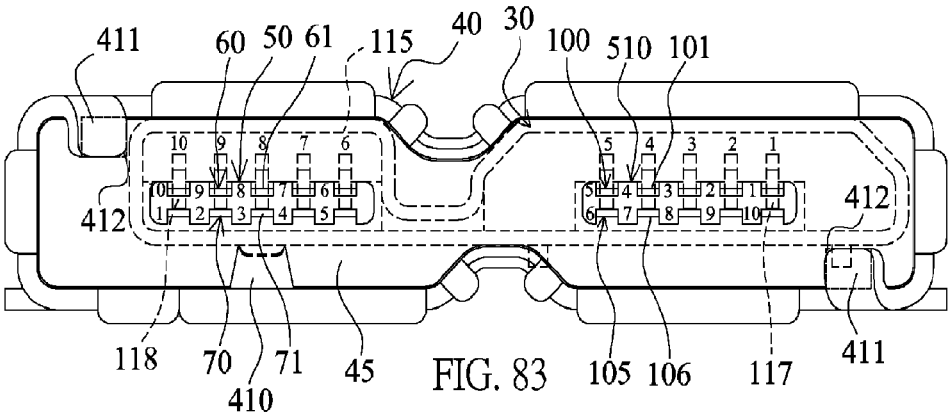

As shown in FIG. 83, when the micro USB 3.0 plug 115 is oppositely inserted into the connection slot 45, the one row of connection terminals 117 of the micro USB 3.0 plug 115 are electrically connected to one row of fourth contact portions 106 on the top of the tongue 510. The other row of connection terminals 118 of the micro USB 3.0 plug 115 are electrically connected to the one row of first contact portions 61 on the top of the tongue 50. The ten connection terminals are correspondingly electrically connected to the contact portions, wherein the connection terminal and the contact portion connected together have the same serial number. At this time, the elastic pressing sheet 410 and the positioning projection 412 of the bottom plate of the metal housing 40 may rest against the micro USB 3.0 plug 115 to form the better positioning effect. The positioning projection 412 of the top plate of the metal housing 40 may be positioned on one side of the micro USB 3.0 plug 115.

Figure 84:
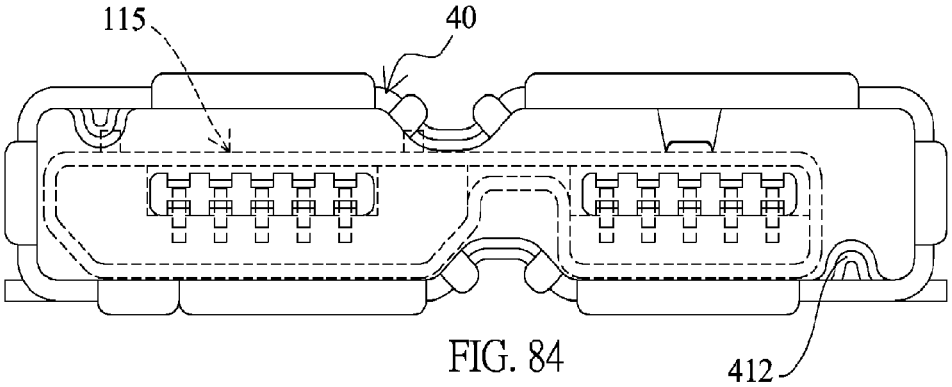
FIGS. 84 and 85 show the usage states of a 36$^{th}$ embodiment of the invention.
Figure 85:
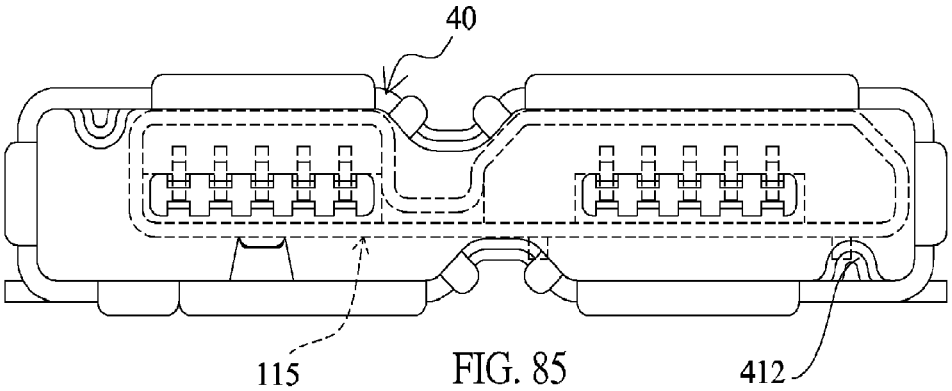

As shown in FIGS. 84 and 85, the 36$^{th}$ embodiment of the invention is a micro USB 3.0 socket for bidirectional insertion and connection of the micro USB 3.0 plug. The structure of this embodiment is almost the same as the 35$^{th}$ embodiment except that this embodiment does not have the guide-in slant sheet, and only has the positioning projection 412. The positioning projection 412 has two sides connected to the metal housing 40, and front and rear ends separated from the metal housing 40.

Two surfaces of the tongue of the invention are formed with contacts, so there are many terminals arranged densely, and the high-frequency requirement is highly needed. The factors affecting the high frequency include the electroconductivity of the terminal, the cross-sectional area of the terminal, and the length of the terminal. In order to achieve the proper high frequency, the cross-sectional area and the length of the terminal need to be changed and then the high-frequency test has to be performed to obtain the desired high-frequency value.

Figure 86:
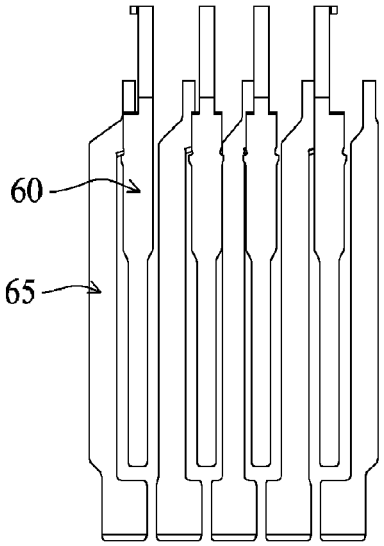
FIG. 86 is a schematic top view showing terminals when the high frequency of the invention is increased.
Figure 87:
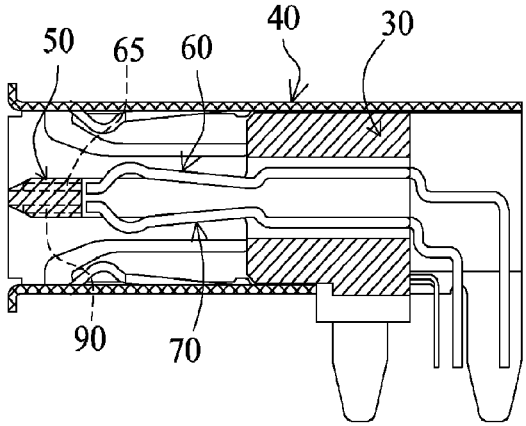
FIG. 87 is a schematic side view showing the terminals when the high frequency of the invention is increased.
Figure 88:
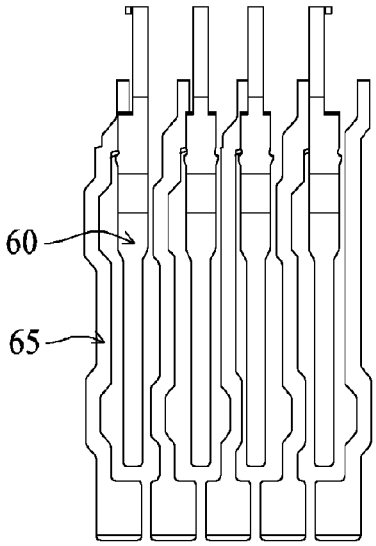
FIG. 88 is a schematic top view showing terminals when the high frequency of the invention is decreased.
Figure 89:
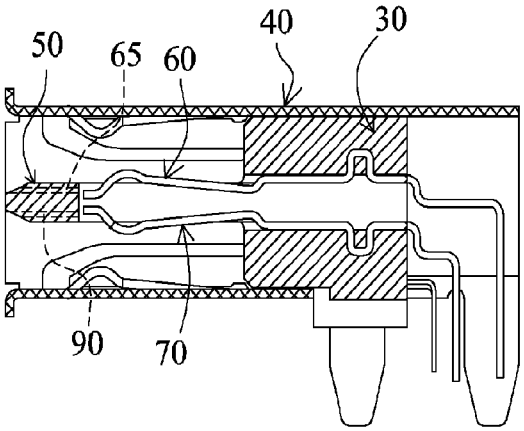
FIG. 89 is a schematic side view showing the terminals when the high frequency of the invention is decreased.

Taking the USB 3.0 socket for bidirectional insertion and connection as an example, as shown in FIGS. 86 and 87, when the high-frequency test does not reach the standard, the plate widths or the plate thicknesses of the two rows of first terminals 60 and 65 and the two rows of second terminals 70 and 90 may be increased so as to increase the frequency. As shown in FIGS. 88 and 89, when the high-frequency test exceeds the standard, the plate widths or the plate thicknesses of the two rows of first terminals 60 and 65 and the two rows of second terminals 70 and 90 may be decreased, or the terminals may be curved to increase the lengths so as to decrease the frequency.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

[1. A socket structure with duplex electrical connection, the socket structure comprising:

a plastic base;

a connection slot, which is disposed in front of the plastic base and may be connected to a plug having at least one row of connection terminals;

a tongue, which has a first surface and a second surface disposed opposite the first surface, and is disposed on one end of the plastic base and within the connection slot, such that chambers of the connection slot on two sides of the tongue make the plug be normally and oppositely inserted and positioned into the connection slot;

at least one row of first contacts separately arranged on the first surface of the tongue, wherein each of the first contacts is electrically connected to a first pin extending out of the plastic base; and at least one row of second contacts separately arranged on the second surface of the tongue, wherein:

each of the second contacts is electrically connected to a second pin extending out of the plastic base;

when the plug is normally inserted into the connection slot with the at least one row of connection terminals of the plug facing the second surface of the tongue, the at least one row of connection terminals of the plug are electrically connected to the at least one row of second contacts; and when the plug is oppositely inserted into the connection slot with the at least one row of connection terminals of the plug facing the first surface of the tongue, the at least one row of connection terminals of the plug are electrically connected to the at least one row of first contacts.]

[2. The socket structure according to claim 1, wherein the at least one row of first contacts and the first pins are formed on at least one row of first terminals; the first terminal is integrally formed with the first contact, a first extension, a first fixing portion and the first pin; the at least one row of second contacts and the second pins are formed on at least one row of second terminals; and the second terminal is integrally formed with the second contact, a second extension, a second fixing portion and the second pin.]

[3. The socket structure according to claim 2, wherein the first contacts of the row of first terminals and the second contacts of the row of second terminals respectively project beyond one of the surfaces of the tongue.]

[4. The socket structure according to claim 1, wherein the chambers of the connection slot on the two sides of the tongue are formed with compatible profiles, the at least one row of connection terminals are formed on only one of the surfaces of the plug, and the at least one row of connection terminals of the plug are electrically connected to only one of the rows of contacts on one of the surfaces of the tongue.]

[5. The socket structure according to claim 1, further comprising a metal housing covering the plastic base, wherein the tongue and the plastic base are integrally formed.]

[6. The socket structure according to claim 3, wherein the tongue is formed with through slots separately arranged, and the first contacts of the first terminals and the second contacts of the second terminals are elastically moved in correspondence with the through slots.]

[7. The socket structure according to claim 6, wherein the first contact of the first terminal and the second contact of the second terminal corresponding to the same one of the through slots are aligned with each other in a front to rear direction.]

[8. The socket structure according to claim 6, wherein the first contact of the first terminal and the second contact of the second terminal are parallel to each other in a left to right direction.]

[9. The socket structure according to claim 3, wherein:

the first contact of the first terminal is prodded and projects beyond a plate surface of the first extension, and one end of the first contact is connected to the first extension and gradually protrudes to the other end from front to rear and is opened; and the second contact of the second terminal is prodded and projects beyond a plate surface of the second extension, and one end of the second contact is connected to the second extension and gradually protrudes to the other end from front to rear and is opened.]

[10. The socket structure according to claim 9, wherein the row of first terminals and the row of second terminals pertain to the same connection interface and have oppositely arranged serial numbers, and the first contact and the second contact are vertically aligned with each other.]

[11. The socket structure according to claim 1, wherein:

the tongue is a circuit board, first traces are formed on a top side of the tongue, and the first trace has the first contact on a front section of the tongue and a first connection terminal on a rear section of the tongue, the first connection terminal is electrically connected to the first pin; and second traces are formed on a bottom side of the tongue, the second trace has the second contact on the front section of the tongue and a second connection terminal on the rear section of the tongue, and the second connection terminal is electrically connected to the second pin.]

[12. The socket structure according to claim 1, wherein the plug has a plastic base and a metal housing, the metal housing covers the plastic base, a chamber is formed between the metal housing and the plastic base, and the chamber is fitted with the tongue when the plug is inserted into the connection slot.]

[13. The socket structure according to claim 1, wherein the plug does not have a metal housing, and when the plug is inserted into the connection slot, the plug may be connected to a top side or a bottom side of the tongue so that two plugs may be simultaneously connected to the top and bottom sides of the tongue.]

[14. The socket structure according to claim 1, wherein the at least one row of first contacts and the at least one row of second contacts pertain to the same connection interface and have oppositely arranged serial numbers, and the plug may be normally and oppositely inserted for electrical connection with the connection terminals of the plug facing upward or downward.]

[15. The socket structure according to claim 14 being a universal serial bus (USB) socket, wherein there are four rows of the first contacts and four rows of the second contacts.]

[16. The socket structure according to claim 14 being a mini universal serial bus (USB) socket, wherein there are five rows of the first contacts and five rows of the second contacts.]

[17. The socket structure according to claim 1, wherein the at least one row of first contacts and the at least one row of second contacts pertain to different connection interfaces, and may be respectively electrically connected to the plug and the other plug, which have the different connection interfaces.]

[18. The socket structure according to claim 1, wherein the tongue is disposed at a middle within the connection slot so that the connection slot is formed with symmetric profiles in up, down, left and right chambers of the tongue.]

[19. The socket structure according to claim 5, wherein at least one side of the metal housing projects inwardly to form at least one laterally elastically movable elastic sheet, and when the plug is inserted into the connection slot, the at least one elastic sheet may rest against the plug or the tongue to prevent the plug from turning.]

[20. The socket structure according to claim 19, wherein the at least one elastic sheet is a middle elastic sheet disposed at a middle height on one side of the connection slot, the plug does not have a metal housing, the plug may be connected to a top side or a bottom side of the tongue when the plug is inserted into the connection slot, and the middle elastic sheet rests against one of the surfaces of the plug formed with the connection terminals.]

[21. The socket structure according to claim 19, wherein the at least one elastic sheet comprises two outer elastic sheets, which are disposed above and below of the tongue on one side of the connection slot, the plug has a plastic base and a metal housing covering the plastic base, a chamber is formed between the metal housing and the plastic base, and when the plug is inserted into the connection slot, the chamber is fitted with the tongue, an elastic sheet on one side of the metal housing is pushed away by the plug, and the other elastic sheet rests against one of the surfaces of the plug.]

[22. The socket structure according to claim 21, wherein the at least one elastic sheet further comprises two inner elastic sheets disposed on inner sides of the two outer elastic sheets, and the two inner elastic sheets respectively rest against top and bottom surfaces on one side of the tongue.]

[23. The socket structure according to claim 21, wherein the at least one elastic sheet further comprises a middle elastic sheet disposed on an inner side of the two outer elastic sheets and disposed at a middle height on one side of the connection slot, and when the plug does not have the metal housing, the plug inserted into the connection slot may be connected to a top side or a bottom side of the tongue, and the middle elastic sheet rests against one of the surfaces of the plug formed with the connection terminals.]

[24. The socket structure according to claim 19, wherein one end of the elastic sheet is connected to one side of the metal housing near a front end of the metal housing and extends inwardly in an arced manner, the elastic sheet has a projection, and the elastic sheet is elastically moved outwardly when the projection is pressed.]

[25. The socket structure according to claim 19, wherein one end of the elastic sheet is connected to a side plate surface of the metal housing and extends outwardly in an arced manner, the elastic sheet has a projection, and the elastic sheet is elastically moved outwardly when the projection is pressed.]

[26. The socket structure according to claim 3, wherein a front end of the first contact has a first guide-in sheet, a front end of the second contact has a second guide-in sheet, the first contact and the second contact are vertically aligned with each other, and the first guide-in sheet and second guide-in sheet are staggered in a left to right direction.]

[27. The socket structure according to claim 1, wherein the plastic base is further formed with at least another connection slot, and the another connection slot has at least one row of terminals to be connected to another plug.]

[28. The socket structure according to claim 14, wherein top and bottom ends of the connection slot are narrower than a middle section of the connection slot so that four corners of a profile of the connection slot have sloped edges.]

[29. The socket structure according to claim 28, wherein each of the four sloped edges on the front end of the connection slot is formed with a slant guiding plate expanding outwardly, and when the plug is inserted into the connection slot to touch the slant guiding plate, the plug is guided toward a center of the connection slot.]

[30. The socket structure according to claim 28 being a micro USB 2.0 socket, wherein each of the at least one row of first contacts and the at least one row of second contacts is a row of five connection terminals, which cannot be elastically moved.]

[31. The socket structure according to claim 1, further comprising:

a second tongue disposed within the connection slot, wherein the second tongue and the tongue are located on the same level and in parallel;

at least one row of third contacts separately arranged on one surface of the second tongue, wherein each of the third contacts is electrically connected to a pin extending out of the plastic base; and at least one row of fourth contacts separately arranged on the other surface of the second tongue, wherein each of the fourth contacts is electrically connected to a pin extending out of the plastic base;

wherein the at least one row of first contacts and the at least one row of third contacts pertain to the same connection interface and have oppositely arranged serial numbers, the at least one row of second contacts and the at least one row of fourth contacts pertain to the same connection interface and have oppositely arranged serial numbers.]

[32. The socket structure according to claim 31 being a micro USB 3.0 socket, wherein each of the at least one row of first contacts, the at least one row of second contacts, the at least one row of third contacts and the at least one row of fourth contacts has one row of five connection terminals, which cannot be elastically moved.]

[33. The socket structure according to claim 14, further comprising:

a second tongue disposed within the connection slot, wherein the second tongue and the tongue are located on the same level and in parallel; and at least one row of third contacts separately arranged on one surface of the second tongue, wherein each of the third contacts is electrically connected to a pin extending out of the plastic base.]

*34. A socket structure configured for a duplex electrical connection, the socket structure comprising:*

*a plastic base;*

*a connection slot, which is disposed in front of the plastic base and configured to be connected to a plug having at least one row of connection terminals;*

*a tongue, which has a first surface and a second surface disposed opposite the first surface, and is disposed on one end of the plastic base and within the connection slot, such that chambers of the connection slot on two sides of the tongue allow the plug to be normally and oppositely inserted and positioned into the connection slot;*

*at least one row of first contacts separately arranged on the first surface of the tongue, wherein each of the first contacts is electrically connected to a respective first pin extending out of the plastic base; and*

*at least one row of second contacts separately arranged on the second surface of the tongue, wherein:*

*each of the second contacts is electrically connected to a respective second pin extending out of the plastic base;*

*when the plug is normally inserted into the connection slot with the at least one row of connection terminals of the plug facing the second surface of the tongue, the at least one row of connection terminals of the plug are electrically connected to the at least one row of second contacts, and the tongue is disposed at a middle within the connection slot so that the connection slot is formed with symmetric profiles in up, down, left and right chambers around the tongue; and*

*when the plug is oppositely inserted into the connection slot with the at least one row of connection terminals of the plug facing the first surface of the tongue, the at least one row of connection terminals of the plug are electrically connected to the at least one row of first contacts, and the tongue is disposed at the middle within the connection slot so that the connection slot is formed with symmetric profiles in up, down, left and right chambers around the tongue.*

*35. The socket structure of claim 34, further comprising a metal housing at least partially covering the plastic base.*

*36. The socket structure of claim 34, wherein the tongue and the plastic base are integrally formed.*

*37. The socket structure of claim 34, further comprising a plurality of slots in the tongue for respective ones of the at least one row of first contacts.*

*38. The socket structure of claim 34, further comprising a plurality of slots in the tongue for respective ones of the at least one row of second contacts.*

*39. The socket structure of claim 34, further comprising a rear cover on the plastic base.*

*40. The socket structure of claim 34, wherein each contact is a portion of a respective terminal.*

*41. The socket structure of claim 34, wherein each of the first contacts is electrically connected to the respective first pin extending out of the plastic base through a rear cover.*

*42. The socket structure of claim 34, wherein each of the second contacts is electrically connected to the respective second pin extending out of the plastic base through a rear cover.*

*43. The socket structure of claim 34, further comprising at least one row of first terminals separately arranged on the first surface of the tongue.*

*44. The socket structure of claim 43, further comprising at least one row of second terminals separately arranged on the second surface of the tongue.*

*45. The socket structure of claim 34, wherein at least two of the first contacts are not in electrical communication with one another.*

*46. The socket structure of claim 34, wherein at least two of the second contacts are not in electrical communication with one another.*

*47. The socket structure of claim 34, wherein the at least one row of first contacts and the respective first pins are formed on respective ones of a row of first terminals.*

*48. The socket structure of claim 34, wherein a first contact and a second contact respectively project beyond one surface of the tongue.*

*49. The socket structure of claim 34, wherein each of the first contacts and each of the second contacts are within the connection slot.*

*50. The socket structure of claim 34, wherein the symmetrical profiles in the up and down chambers are the same, and the symmetrical profiles in the left and right chambers are the same.*

*51. The socket structure of claim 34, wherein the socket structure does not include the plug.*

*52. A socket structure configured for a duplex electrical connection with a plug, the socket structure comprising:*

*a plastic base;*

*a connection slot, which is disposed in front of the plastic base and configured to be connected to the plug having at least one row of connection terminals;*

*a tongue, comprising a first surface and a second surface disposed opposite the first surface, the tongue being disposed on one end of the plastic base and within the connection slot, such that chambers of the connection slot on two sides of the tongue allow the plug to be normally and oppositely inserted and positioned into the connection slot based on an operational state of when the socket structure is connected to the plug;*

*at least one row of first contacts separately arranged on the first surface of the tongue, wherein each of the first contacts is electrically connected to a respective at least first pin extending out of the plastic base; and*

*at least one row of second contacts separately arranged on the second surface of the tongue, wherein*

*each of the second contacts is electrically connected to a respective at least second pin extending out of the plastic base: and, the socket structure is configured for two separate operational states: a first operational state*

*when the plug is normally inserted into the connection slot with the at least one row of connection terminals of the plug facing the second surface of the tongue, the at least one row of connection terminals of the plug are configured to electrically connect to the at least one row of second contacts, and the tongue is disposed at a middle within the connection slot so that the connection slot is formed with symmetric profiles in up, down, left and right chambers around the tongue; and a second operational state*

*when the plug is oppositely inserted into the connection slot with the at least one row of connection terminals of the plug facing the first surface of the tongue, the at least one row of connection terminals of the plug are configured to electrically connect to the at least one row of first contacts, and the tongue is disposed at the middle within the connection slot so that the connection slot is formed with symmetric profiles in up, down, left and right chambers around the tongue.*

*53. The socket structure of claim 52, further comprising a metal housing at least partially covering the plastic base.*

*54. The socket structure of claim 52, wherein the tongue and the plastic base are integrally formed.*

*55. The socket structure of claim 52, further comprising a plurality of slots in the tongue for respective ones of the at least one row of first contacts.*

*56. The socket structure of claim 52, further comprising a plurality of slots in the tongue for respective ones of the at least one row of second contacts.*

*57. The socket structure of claim 52, further comprising a rear cover on the plastic base.*

*58. The socket structure of claim 52, wherein each contact is a portion of a respective terminal.*

*59. The socket structure of claim 52, wherein each of the first contacts is electrically connected to the respective first pin extending out of the plastic base through a rear cover.*

*60. The socket structure of claim 52, wherein each of the second contacts is electrically connected to the respective second pin extending out of the plastic base through a rear cover.*

*61. The socket structure of claim 52, further comprising at least one row of first terminals separately arranged on the first surface of the tongue.*

*62. The socket structure of claim 61, further comprising at least one row of second terminals separately arranged on the second surface of the tongue.*

*63. The socket structure of claim 52, wherein at least two of the first contacts are not in electrical communication with one another.*

*64. The socket structure of claim 52, wherein at least two of the second contacts are not in electrical communication with one another.*

*65. The socket structure of claim 52, wherein the symmetrical profiles in the up and down chambers are the same, and the symmetrical profiles in the left and right chambers are the same.*

*66. The socket structure of claim 52, wherein the socket structure does not include the plug.*

*67. A socket structure configured for a duplex electrical connection with a plug, the socket structure comprising:*

*a plastic base;*

*a connection slot, which is disposed in front of the plastic base and configured to be connected to the plug having at least one row of connection terminals;*

*a tongue, comprising a first surface and a second surface disposed opposite the first surface, the tongue being disposed on one end of the plastic base and within the connection slot, such that chambers of the connection slot on two sides of the tongue allow the plug to be normally and oppositely inserted and positioned into the connection slot based on an operational state of when the socket structure is connected to the plug;*

*at least one row of first contacts separately arranged on the first surface of the tongue, wherein each of the first contacts is electrically connected to a respective at least first pin extending out of the plastic base;*

*at least one row of second contacts separately arranged on the second surface of the tongue, wherein*

*each of the second contacts is electrically connected to a respective at least second pin extending out of the plastic base; and, the socket structure is configured for two separate operational states: a first operational state*

*when the plug is normally inserted into the connection slot with the at least one row of connection terminals of the plug facing the second surface of the tongue, the at least one row of connection terminals of the plug are configured to electrically connect to the at least one row of second contacts; and a second operational state*

*when the plug is oppositely inserted into the connection slot with the at least one row of connection terminals of the plug facing the first surface of the tongue, the at least one row of connection terminals of the plug are configured to electrically connect to the at least one row of first contacts; and*

*a metal housing coveting the plastic base wherein the tongue and the plastic base are integrally formed,*

*wherein:*

*at least one side of the metal housing projects inwardly to form at least one laterally elastically movable elastic sheet, and when the plug is inserted into the connection slot, the at least one elastic sheet may rest against the plug or the tongue to prevent the plug from turning when inserted,*

*the at least one elastic sheet comprises a first outer elastic sheet and a second outer elastic sheet which are disposed above and below of the tongue on one side of the connection slot, the plug has a plastic base and a metal housing covering the plastic base, a chamber is formed between the metal housing and the plastic base, and when the plug is inserted into the connection slot, the chamber is fitted with the tongue, the first outer elastic sheet on one side of the metal housing is pushed away by the plug, and the second outer elastic sheet rests against one of the surfaces of the plug, and*

*the at least one elastic sheet further comprises two inner elastic sheets disposed on inner sides of the two outer elastic sheets, and the two inner elastic sheets respectively rest against top and bottom surfaces on one side of the tongue.*

*68. A socket structure configured for a duplex electrical connection with a plug, the socket structure comprising:*

*a plastic base;*

*a connection slot, which is disposed in front of the plastic base and configured to be connected to the plug having at least one row of connection terminals;*

*a tongue, comprising a first surface and a second surface disposed opposite the first surface, the tongue being disposed on one end of the plastic base and within the connection slot, such that chambers of the connection slot on two sides of the tongue allow the plug to be normally and oppositely inserted and positioned into the connection slot based on an operational state of when the socket structure is connected to the plug;*

*at least one row of first contacts separately arranged on the first surface of the tongue, wherein each of the first contacts is electrically connected to a respective at least first pin extending out of the plastic base; and*

*at least one row of second contacts separately arranged on the second surface of the tongue, wherein*

*each of the second contacts is electrically connected to a respective at least second pin extending out of the plastic base; and, the socket structure is configured for two separate operational states: a first operational state*

*when the plug is normally inserted into the connection slot with the at least one row of connection terminals of the plug facing the second surface of the tongue, the at least one row of connection terminals of the plug are configured to electrically connect to the at least one row of second contacts; and a second operational state*

*when the plug is oppositely inserted into the connection slot with the at least one row of connection terminals of the plug facing the first surface of the tongue, the at least one row of connection terminals of the plug are configured to electrically connect to the at least one row of first contacts,*

*wherein:*

*the at least one row of first contacts and the first pins are formed on at least one row of first terminals,*

*the first terminal is integrally formed with the first contact, a first extension, a first fixing portion and the first pin,*

*the at least one row of second contacts and the second pins are formed on at least one row of second terminals, and the second terminal is integrally formed with the second contact, a second extension, a second fixing portion and the second pin,*

*the first contacts of the row of first terminals and the second contacts of the row of second terminals respectively project beyond one of the surfaces of the tongue, and*

*a front end of the first contact has a first guide-in sheet, a front end of the second contact has a second guide-in sheet, the first contact and the second contact are vertically aligned with each other, and the first guide-in sheet and second guide-in sheet are staggered in a left to right direction.*

* * * * *